(12) United States Patent
McPheters et al.

(10) Patent No.: US 12,340,345 B2
(45) Date of Patent: Jun. 24, 2025

(54) INVENTORY MANAGEMENT AND TRANSFER SYSTEM

(71) Applicant: Stadium Enterprises LLC, Wilmington, DE (US)

(72) Inventors: John McPheters, Brooklyn, NY (US); Jed Stiller, Hoboken, NJ (US)

(73) Assignee: Stadium Enterprises LLC, Wilmington, DE (US)

( * ) Notice: Subject to any disclaimer, the term of this patent is extended or adjusted under 35 U.S.C. 154(b) by 315 days.

(21) Appl. No.: 18/187,490

(22) Filed: Mar. 21, 2023

(65) Prior Publication Data

US 2023/0325767 A1  Oct. 12, 2023

Related U.S. Application Data

(60) Provisional application No. 63/322,385, filed on Mar. 22, 2022.

(51) Int. Cl.
*G06Q 10/087* (2023.01)
(52) U.S. Cl.
CPC .................. *G06Q 10/087* (2013.01)
(58) Field of Classification Search
CPC ................................... G06Q 10/087
USPC ......................................... 705/28
See application file for complete search history.

(56) References Cited

U.S. PATENT DOCUMENTS

| 7,770,792 B2 * | 8/2010 | Bruns | G06Q 10/087 |
| | | | 705/28 |
| 2024/0054451 A1 * | 2/2024 | Song | G06Q 10/087 |

FOREIGN PATENT DOCUMENTS

| CN | 115456473 A | * 12/2022 | |
| CN | 113064950 B | * 4/2024 | G06F 16/27 |
| JP | 2024500818 A | * 1/2024 | G06Q 10/063 |
| WO | WO-2020183427 A1 | * 9/2020 | B65G 1/0464 |

* cited by examiner

*Primary Examiner* — Russell S Glass
(74) *Attorney, Agent, or Firm* — Fenwick & West LLP

(57) ABSTRACT

An inventory management system for managing inventory ownership in a shared inventory space is described. The system includes receivers configured to receive data from sources external to the inventory management system. Transmitters are configured to transmit data to sources external to the inventory management system. A bundle generation is configured to receive transfer data from a first user via the one or more receivers indicating a group of items to be made available for a transfer of ownership. The transfer of ownership of the group of items is to be made as a single transaction. The system processes the received transfer data and generates a bundle data record of data parameters based on the transfer data. A transaction management processor provides information identifying available groups of items available for transfer of ownership and a transaction fulfilment processor provide the item data to the transaction management processor.

20 Claims, 13 Drawing Sheets

Example Data Structure

| Item Description | Amount of Item in bundle | Selling price of item | Selling price of bundle | Remuneration details | Location of item | Bundle owner | Bundle reference | Timestamp | Purchase status |
|---|---|---|---|---|---|---|---|---|---|
| 42 | 44 | 46 | 48 | 50 | 52 | 54 | 56 | 58 | 60 |

INVENTORY MANAGEMENT AND TRANSFER SYSTEM

CROSS-REFERENCE TO RELATED APPLICATION

This application claims priority from and the benefit of U.S. Provisional Application No. 63/322,385, entitled "INVENTORY MANAGEMENT AND TRANSFER SYSTEM," filed Mar. 22 2022, which is hereby incorporated by reference in its entirety for all purposes.

FIELD OF DISCLOSURE

The present disclosure relates to systems and methods for managing physical inventory, and more particularly though not exclusively, to digitally transferring ownership of physical inventory in one or more locations.

BACKGROUND

When placing goods for sale in a digital retail environment, it is often necessary for physical inventory space in a warehouse to be utilised such that the goods are immediately available for dispatch to an end consumer. Sales to the end consumer in these environments are often of a small scale (i.e., an end consumer will often only purchase one or two of an item at a time). However, in order to operate effectively in such an environment, goods will often need to be stored in a warehouse in bulk, so that multiple end consumers are able to make purchases.

Due to the inherent unpredictability of the demand for goods at a given time, this can lead to an unfavourable situation in which goods remain unsold for a large period of time, further causing inventory management issues. In particular, a seller may only have limited inventory space available and an excess of a particular good may prevent the seller from storing additional goods. When an initial bulk purchase of goods for storage in a warehouse is made by the seller, there may be an expected lead time of how long goods are expected to remain in the warehouse, based on current demand levels and expected future demand levels for the goods. Such demands can fluctuate rapidly based on external factors and in cases where demand decreases, this can lead to the goods remaining in the warehouse for longer than expected. In some instances, a seller may already have pre-allocated that warehouse space for further bulk purchased goods or for goods that are being manufactured by the seller and need storage. If the original goods remain in the warehouse due to decreased demand, there may be no space for the newly purchased/manufactured goods, causing inventory management issues.

An additional problem which arises due to the unpredictability of demand shown in the above example is the unpredictability of cash flows associated with the initial purchase of goods in bulk by the seller and the ultimate purchase of goods by the end consumer(s). When an initial bulk purchase is made by the seller, a cost is often incurred. This cost is offset by the receipt of funds when each good is purchased by an end consumer. Where the demand fluctuates (and particularly where the demand decreases), this can lead to a disruption to the expected received cash flow. This can be particularly disruptive where the seller operates in a cash flow sensitive environment (such as in a "just in time" supply chain).

Current solutions to alleviate these problems would require that the seller either relocate their goods, purchase additional warehouse space, sell them in bulk at short notice to another goods seller and deliver the goods to another location, or simply destroy the goods (particularly when considering the limited inventory space problem described above). However, such solutions bring about additional problems such as:

Additional cost and delivery logistics when supplying the goods to another seller.

Additional cost associated with purchasing further warehouse space.

Reduced cash flows associated with selling in bulk at short notice.

Disrupted cash flows where goods are necessarily destroyed.

Furthermore, in solutions in which goods are sold to another seller, the efficacy of such a system can be limited by the communication chains between sellers. The original seller will need to approach the potential second seller with an offer (which is not guaranteed to succeed), and this process will necessarily be time inefficient. Such an inefficient system may mean that the sale and delivery of goods between sellers cannot occur in a timely manner, meaning that the problems noted above are not solved.

Finally, the solutions noted above are also limited by the fact that they exclude the operation of the original retail supply chain. In particular, when the above actions are employed, this will necessarily prevent the seller from concurrently continuing to sell goods to the end consumer. This can be particularly disadvantageous as the continued sale may help to either alleviate or entirely overcome the reduced demand problem, and following one of the above options could lead to a more unfavourable outcome than if the goods were to be sold.

The embodiments described below seek to overcome or alleviate one or more of the problems described above.

It is to be noted that whilst the above noted problems are described with reference to a retail environment, it is to be appreciated that the embodiments below may also be used in a more general purpose inventory management scenario in which inventory space for a party is necessarily finite.

BRIEF DESCRIPTION OF DRAWINGS

In order that the present disclosure may be more readily understood, reference will now be made, by way of example, to the accompanying drawings in which:

FIG. 2 illustrates an exemplary bundle data record to be used with the inventory management system of FIG. 1;

DETAILED DESCRIPTION

Specific embodiments are now described with reference to the appended figures.

The present embodiments are directed to computer-implemented systems and methods which use a centralised inventory management system to efficiently allow a first user to manage their inventory through interactions with other users of the system. In particular, the system of some embodiments allows a user to efficiently reallocate items of inventory to another user within a particular location (either the same or an alternative location) in order to provide the initial user with additional space for further inventory. In some embodiments of the system, the locations (whether a single geographical location or a plurality of locations) all form part of a shared inventory space, where portions of the shared inventory space are allocated for use by a particular user. A further function of the system in certain embodiments is to enable a flexible arrangement in which inventory can be reallocated to multiple users of the system (either direct users or indirect users) which uses multiple supply chains concurrently in order to maximise the efficiency of reallocation for the first user. The system is described below with reference to a retail environment but is not limited to such an environment. For example, the present system could also be used in a manufacturing environment in which a factory has limited capacity for the storage of component parts. In such an environment, manufacturing delays in a particular portion of the manufacturing chain may lead to a deficiency of certain components and a surplus of other components, thereby exacerbating the delay in the manufacturing chain. The present system may be employed to reallocate certain component items between users within the manufacturing environment in order to alleviate the delay in the manufacturing chain.

The described system of certain embodiments operates by enabling a user to list particular inventory items for sale (or general disposal) to other users of the system. In particular, the user may indicate that a plurality of items are available for sale or disposal as a singular purchase. This differs from traditional sale or disposal flows in which an end user may purchase any number of a particular item without any restriction of the number of items which are purchased. By enabling the bulk sale or disposal of particular items, this can enable the initial user (i.e., seller) to quickly reduce the inventory space which is being utilised to house these items and effect a quick increase in assigned inventory space for the seller, in a manner which is more immediate than can be effected through piecemeal sale of the goods to an end consumer.

Figure 1:
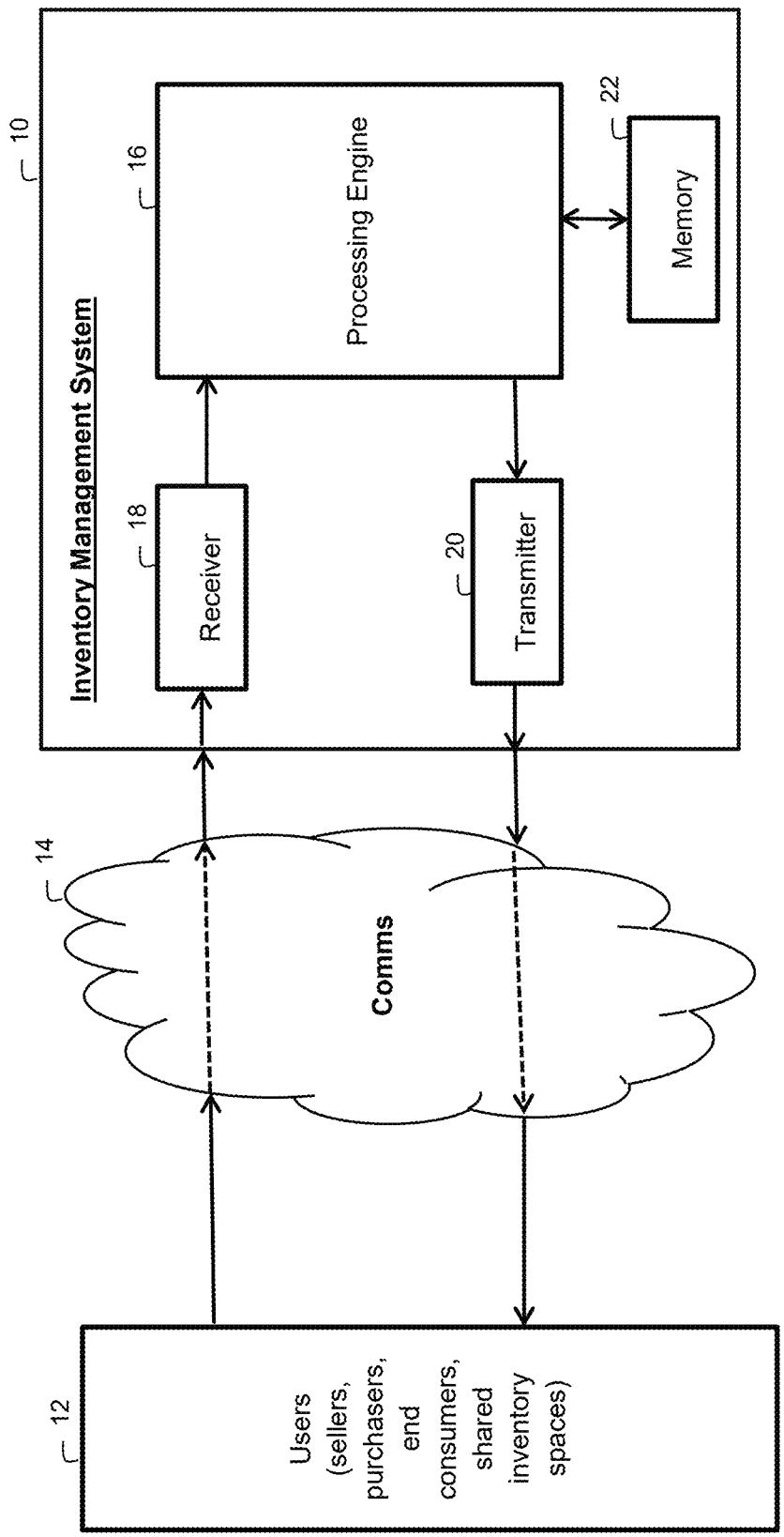
FIG. 1 is a schematic block diagram, showing an inventory management system, illustrating a use scenario in accordance with an embodiment of the present disclosure.

Turning first to FIG. 1, there is shown a high level schematic block diagram of the inventory management system 10 in a use scenario in accordance with an embodiment. In particular, the inventory management system 10 is implemented within a shared inventory space. The shared inventory space may be one or more locations indicating a general area in which items belonging to a plurality of parties may reside. The inventory management system 10 enables multiple aspects of items within the shared inventory space to be managed, such as ownership, verification of items present in the shared inventory space, and purchase and sales of the items. The illustrated inventory management system 10 comprises features which enable the system to receive data from one or more users 12, to process the received data and then to subsequently transfer data to one or more further users, where these users may be the same or distinct from the users who sent the initially received data. The users 12 may include sellers of bulk sale items, purchasers of the bulk sale items, and end consumers of individual items. The system is provided with one or more processing engines 16, physical memories 22, receivers 18, transmitters 20 and/or transceivers which enable the required functionality described herein. It is to be appreciated that the described systems and methods may receive and transmit data to and from users 12 which relate to a plurality of functions of the system, and the system is configured to process the received data in a plurality of ways in order to enable the required functionalities of the various embodiments of the system. It is also to be appreciated that whilst one receiver 18, transmitter 20, and memory 22 are shown in FIG. 1, this is for illustrative purposes only, and that more of these features may be provided as functionality dictates. In the embodiment of FIG. 1, the system is shown as receiving and transmitting data wirelessly 14. It is to be appreciated that the system may also be configured to receive some transmissions through wired communications in some embodiments of the system. It is also to be appreciated that some aspects of the present system may require interaction with the shared inventory space (e.g., interactions with shared inventory space computer systems to update inventory received or removed from the space). In such cases, the inventory management system 10 may be configured to also exchange data with computer infrastructure within the shared inventory space (shown as a user 12 in FIG. 1). Such exchange of data may be achieved through use of the previously described receivers 18 and transmitters 20.

The described computer-implemented systems and methods utilise the creation of digital "bundles" within the system. These digital bundles are representative of physical items (inventory) within a location which occupy, or are intended to occupy, a physical space (i.e. the shared inventory space) and are a digital representation of items of inventory that a user 12 is offering for transfer. The digital bundles may comprise a bundle data record, the data record comprising data parameters which provide information corresponding to physical characteristics of the items to which the digital bundle corresponds. An illustration of the structure of the data bundle structures 40 is shown in FIG. 2. By way of illustrative example, the data parameters may relate to a description of an item in a bundle 42 (e.g. red sneakers), the amount of a particular item in a bundle 44, the selling price of an item within the bundle 46, the selling price of the whole bundle 48, remuneration details for the seller 50 and the physical location of the items in the bundle 52. It is to be appreciated that this list is provided for the purposes of illustration and is not to be interpreted as exhaustive. Additionally, the data parameters may also comprise additional information which are relevant for the processing of the bundle in the system and do not relate to physical characteristics of the items in the bundle. For example, these data parameters may comprise, the name of the user who is offering the goods in the bundle for transfer 54, a reference for the bundle 56, a time stamp 58 indicating when the bundle was created and a status 60 of whether the bundle has been selected for transfer by a user 12. Again, it is to be appreciated that this list is provided for the purposes of illustration and is not to be interpreted as exhaustive.

Figure 3:
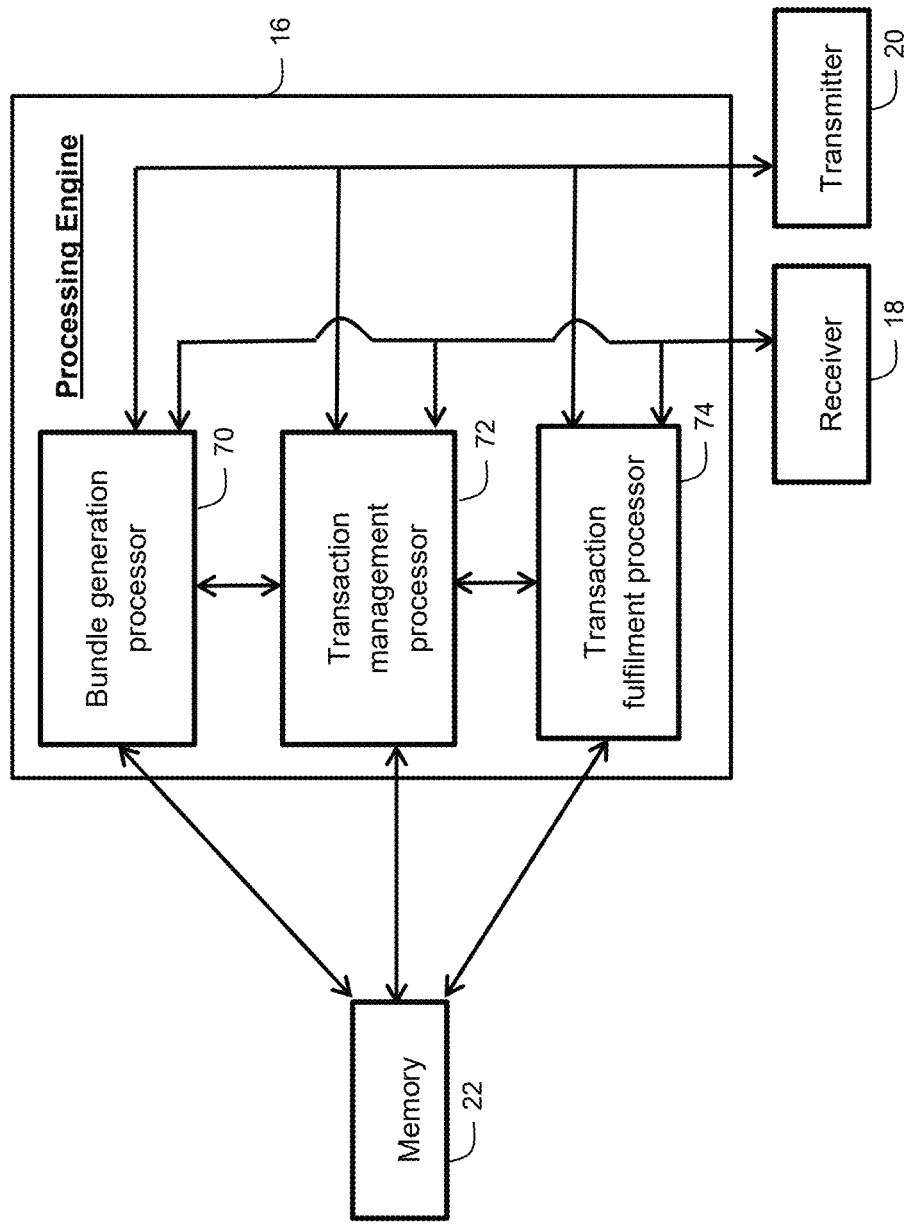
FIG. 3 is a schematic block diagram, showing a processing engine of the inventory management system of FIG. 1.

Referring now to FIG. 3, there is shown a high level schematic block diagram of aspects of the processing engine 16 in an embodiment of the inventory management system 10 of FIG. 1. The illustrated processing engine 16 comprises a bundle generation processor 70, a transaction management processor 72 and a transaction fulfilment processor 74. These features in combination enable the creation of a digital bundle in accordance with embodiments above, and subsequently enable the process of the transfer of the physical goods represented by the bundle between two parties. It is to be appreciated that additional features with additional functionalities may be included in other embodiments of the processing engine 16. It is further to be appreciated that whilst FIG. 3 shows one illustrated receiver 18, transmitter 20 and memory 22 of the inventory management system 10, there may also be a plurality of these elements provided in the inventory management system 10. It is also to be appreciated that in some embodiments, the functionality of the bundle generation processor 70, the transaction management processor 72 and the transaction fulfilment processor 74 may be included within more or fewer processors than are illustrated in FIG. 3.

The bundle generation processor 70 of the processing engine 16 is configured to receive data from a user 12 indicating items that are to be included in a digital bundle and use this information to create a digital bundle in accordance with the above embodiments. The data may be received from a user device, where the user device may be any communications device suitable for providing and receiving data in accordance with the described functionality described herein. The received data may comprise a list of data parameters as described with reference to the bundles above which enable a data record to be created. Alternatively, the received data may comprise other data which enables data parameters to be created to enable the creation of the digital bundle. The data may be received through the receiver 18 of FIG. 1, to which the bundle generation processor 70 may be communicably coupled. Further, in some cases the bundle generation processor 70 may be configured to provide data to a user 12, and this data may be provided via the transmitter 20 of FIG. 1, to which the bundle generation processor 70 may be communicably coupled. The bundle generation may also be configured to store generated bundles in the memory 22 of FIG. 1, to which the bundle generation processor 70 may be communicably coupled. In some cases, the bundle generation processor 70 may also be configured to retrieve data from the memory 22. The operation of the bundle generation processor 70 is described in greater detail with reference to FIG. 4.

The transaction management processor 72 is configured to generate listings for bundles that are created by the bundle generation processor 70. The transaction management processor 72 in some embodiments is configured to receive information regarding created bundles directly from the bundle generation processor 70 to which it may be communicably coupled. In alternative and additional embodiments, the transaction management processor 72 may also be configured to be communicably coupled to the memory 22 in which bundle data records are stored. In such embodiments, the transaction management processor 72 may be configured to retrieve information regarding created bundles from the memory 22.

The transaction management processor 72 is also configured to mediate transactions to enable the transfer of inventory items in a bundle. In particular, this may comprise receiving requests to purchase or otherwise obtain the items in a bundle from a user and updating the data record of the bundle in order to indicate that the bundle has been purchased or obtained. This may also concurrently result in the transaction management processor 72 delisting a bundle for which a request for purchase has been made. The requests may be received from a user device, where the user device may be any communications device suitable for providing and receiving data in accordance with the described functionality described herein.

The transaction management processor 72 may also be configured to manage the settlement of the bundle transaction (where the remuneration for the settlement will typically be an accepted currency). This may comprise the transaction management processor 72 receiving and storing payment details from the user 12 who wishes to obtain the items in the listing. In some embodiments, once the payment details are received, the payment may be immediately processed to transfer payment to the seller. In some instances, the payment may be held until such a time that it is confirmed that the items in the bundle listing are present (or have been delivered to) the shared inventory space. This information may be provided by the transaction fulfilment processor 74 (described in further detail below). It is to be appreciated that in some embodiments, remuneration may not be required (i.e. the transfer may simply be requested without requirement of payment). In these examples, the settlement of remuneration would be unnecessary.

The transaction management processor 72 may further be configured to modify the contents of a bundle listing in the memory 22. In particular, in some embodiments, a user 12 making a purchase may only wish to obtain a portion of the items listed in the bundle. In such cases, the transaction management processor 72 may be configured to amend the contents of the relevant bundle to reflect this such that only the portion of the bundle which the user 12 wishes to obtain are included in the data record. In such instances, the transaction management processor 72 may be further configured to create a new bundle relating to the items which are not included in the users request, and to store this in the memory 22. A listing may then subsequently generated for this new bundle. In some embodiments, the process of modifying the bundle and creating a new bundle may be enacted by the bundle generation processor 70, where the data received by the transaction management processor 72 is transmitted to the bundle generation processor 70 to enable this.

In some embodiments, the transaction management processor 72 may further be configured to accept forms of remuneration other than currency. For instance, in some embodiments, physical items of inventory to be stored in the shared inventory space may be offered as remuneration. In such examples, the transaction management processor 72 may be configured to receive data relating to the items to be used as remuneration and create a new bundle data record relating to these items. This may then be stored in the memory 22. In alternative embodiments, the data may be passed to the bundle generation processor 70 to create the bundle. The created bundle may then be monitored in an analogous manner to the originally created bundle.

The operation of the transaction management processor 72 is described in greater detail with reference to FIG. 6.

The transaction fulfilment processor 74 is configured to monitor items which are present in the shared inventory space in order to determine whether a transaction relating to a digital bundle has been fully settled. In particular, the transaction fulfilment processor 74 is configured to receive and transmit data from and to the transaction management processor 72 in order to determine items which are required in order to fulfil settlement of a bundle, to determine if and when those items are present in a shared inventory space, and to subsequently use the data regarding the presence of the items in order to indicate if and when the settlement of a bundle may be enacted.

In particular, the transaction fulfilment processor 74 may be communicably coupled to the transaction management processor 72 and configured to receive data regarding digital bundles for which a request to purchase (or otherwise obtain) has been made. This data may include an indication of items which must be present in the shared inventory space in order for the bundle settlement to be considered fulfilled.

The transaction fulfilment processor 74 in some embodiments is configured to receive data regarding items which are present in the shared inventory space. In some embodiments, this data is received directly from inventory stocking systems within the shared inventory space. This may comprise the transaction fulfilment processor 74 requesting data regarding the items present in the shared inventory space from the inventory stocking systems upon receiving data from the transaction management processor 72 regarding a bundle that is to be fulfilled. The transaction fulfilment processor 74 may then compare the data received from the inventory stocking systems to determine if the items required to fulfil the bundle are present. If so, the transaction fulfilment processor 74 may send data to the transaction management processor 72 to indicate the bundle requirements have been met. If the items are not present, the transaction fulfilment processor 74 of some embodiments may be configured to periodically query the inventory stocking systems to determine if and when new items of inventory have been delivered to the shared inventory space. In other embodiments, the transaction fulfilment processor 74 may be configured to provide the inventory stocking systems with a request to provide an indication when any items which are required by the bundle have been delivered to the shared inventory space. In some embodiments, once an item required for bundle fulfilment has been indicated as being present in the shared inventory space, the transaction fulfilment processor 74 may directly update the bundle details in the memory 22 and the transaction management processor 72 may be configured to periodically retrieve the details regarding the digital bundle from the memory 22. The operation of the transaction fulfilment processor 74 is described in greater detail with reference to FIG. 8.

Figure 4:
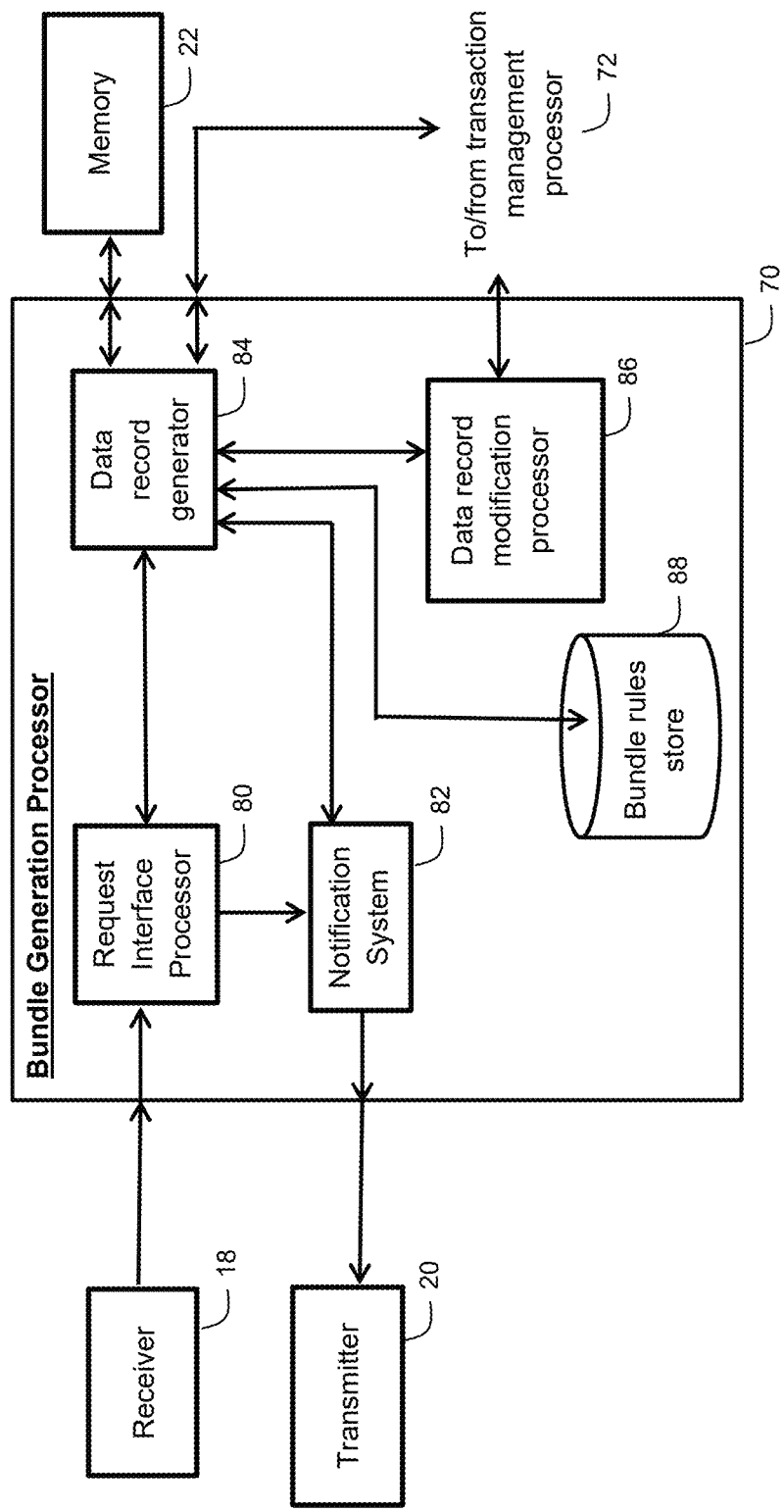
FIG. 4 is a schematic block diagram, showing a bundle generation processor of the processing engine of FIG. 1.

Turning now to FIG. 4, there is shown in greater detail the bundle generation processor 70 of FIG. 3. Specifically, FIG. 4 illustrates the features which may be included in the bundle generator processor to achieve the desired functionality of the inventory management system 10.

The bundle generation processor 70 may firstly comprise a request interface processor 80 which is configured to be communicably coupled to the receiver 18 of the inventory management system 10. The request interface processor 80 is configured to receive requests (transfer data) to create new bundles from users 12 wishing to sell or dispose of items of inventory in a shared inventory space (referred to as "sellers"). These requests may comprise a listing for a plurality of items. The items to be sold may comprise a single type of item (e.g. red sneakers) or a plurality of items (e.g. red sneakers and blue sneakers). Irrespective of the number of items or the number of types of items, the bundle may be considered as a single "item" to be sold or disposed of.

The request interface processor 80 is configured to receive request for bundles from a seller through the receiver 18 of the inventory management system 10. The request interface processor 80 is configured to receive and process the received requests such that they are in a suitable format to be further processed by the bundle generator processor. The information processing may comprise determining whether enough information has been supplied in order for a bundle to subsequently be generated. In particular, the processing may comprise determining whether the request contains sufficient data to create a bundle data record in accordance with the functionality of the present disclosure. This processing may also comprise determining whether the integrity of the request (in the case that some of the provided data may have been corrupted during the request). This may also comprise determining whether the request has come from a seller who is authorised to create bundles using the inventory management system 10.

In the case that the request interface processor 80 determines that the received information cannot be used to create a data bundle, the request interface processor 80 is configured to send an instruction to a notification system 82 to which the request interface processor 80 is communicably coupled. The instruction may be configured to indicate that the received request cannot be processed and the reasons for this (e.g. incomplete data, unauthorised seller etc). The notification system 82 may then be configured to generate a notification to be transmitted to the seller using the transmitter 20 of the inventory management system 10.

Returning now to the request interface processor 80, if it is determined that the received request may be used to generate a bundle, the information received from the initial request may then be passed to the data record generator 84. The data record generator 84 is configured to process the information received in the request in order to create a bundle data structure. The bundle data structure 40 may be in accordance with the example provided in FIG. 2 and as described above. It is to be appreciated however that the bundle data structure 40 may be in any format which enables the functionality of the present disclosure.

The data record generator 84 parses the information received from the request in order to determine the information which has been provided and to categorise the information in the appropriate categories (e.g. item description, amount of item in bundle, selling price of item etc) of the data structure 40. The data record generator 84 may also be configured to append the received information with additional information which aids in the subsequent processing of the bundle data record. In particular, the data record generator 84 may append the record with a bundle reference, a timestamp and a purchase status, which may be used to reference, search, and process the bundle. In cases where the bundle is intended to include a plurality of different types of items (i.e. items with different item descriptions), the data record generator 84 may be configured to create a plurality of bundle data structures 40, where each of the bundle data structures 40 is provided with at least the same bundle reference such that when a bundle is subsequently searched or retrieved, each of the relevant structures 40 for each of the types of item may be retrieved. In these instances, the bundle reference may include a further sub reference which enables a particular search to be performed for a specific item within the bundle. Alternatively, other categories in the data structure 40 may be used for this purpose (i.e. by provision of an item description in a search).

In some embodiments, the inventory management system 10 may be configured to provide restrictions regarding aspects of the bundles which may be created. For example, the inventory management system 10 may require that for a particular item to be included in a bundle, the price of that item must lie in a particular range. Alternatively, only certain numbers of particular items may be sold in a particular bundle, or only certain items may be sold. When the data record generator 84 creates a bundle, it may be configured to determine whether the bundle to be created is in accordance with these restrictions. In such configurations, the data record generator 84 may be configured to be communicably coupled to a bundle rules store 88 and to retrieve relevant rules for the bundle, and to compare the details of the bundle to be created with these rules. In some embodiments, the restrictions may be stored in the memory 22 of the inventory management system 10. In the case that the bundle is in accordance with any restrictions, the data bundle generator may be created. In the cases that the bundle is not in accordance with any restrictions, the data record generator 84 may be configured to send an instruction to the notification system 82 (to which it may be communicably coupled). The instruction may be configured to indicate that the bundle is invalid and to provide details regarding why the bundle is invalid (e.g. the item is not suitable for listing, the price is not within a predetermined range etc.). The notification system 82 may then be configured to generate a notification to be transmitted to the seller using the transmitter 20 of the inventory management system 10.

Returning to the scenario in which one or more bundle data structures 40 are created, once the bundle data structures 40 have been placed into an appropriate form in accordance with embodiments described above, the data structures 40 are then placed into the memory 22 of the inventory management system 10 (or any appropriate memory) to be stored for further retrieval. The bundle data structures 40 are each stored with an identifier which enable the structures 40 to be retrieved when desired. This may comprise the bundle reference which may be appended to the data structure 40. The bundle data structures 40 which are placed in the memory 22 may be configured to be retrieved by any feature of the inventory management system 10 which required access to the bundle data structures 40.

Once the bundle data structures 40 have been stored in the memory 22, the data record generator 84 may be configured to send a notification to the transaction management processor 72 in order to indicate that a new bundle has been created for the purposes of listing for selling or other disposal. In some embodiments, the transaction management processor 72 may be configured to send a notification back to the data record generator 84 to indicate that the notification has been received. The operation of the transaction management processor 72 is described in greater detail below with reference to FIG. 6.

Similarly, once the bundle data structures 40 have been stored in the memory 22, the data record generator 84 may be configured to send a notification to the user 12 who provided the request in order to inform them that the requested bundle has been successfully created. This may comprise the data record generator 84 creating an instruction to be enacted by the notification system 82 which causes the notification system 82 to inform the user 12 of the creation of the bundle through use of the transmitter 20 of the inventory management system 10.

In some embodiments, the bundle generation processor 70 also includes a data record modification processor 86. In these embodiments, the data record modification processor 86 may be configured to receive notifications from the transaction management processor 72 indicating that a change to a particular bundle data record is required. In some embodiments, this may comprise the transaction management processor 72 indicating that a bundle has been purchased and the purchase status of the bundle should therefore be updated. The bundle may also be updated with the identity of the purchaser of the bundle (if this information is provided). In other embodiments, this may alternatively or additionally comprise the selling price of an item of the bundle being updated. In any case, the data record modification processor 86 may be configured to receive the notification from the transaction management processor 72 and to determine a bundle data record which is to be modified, and any relevant parameters which are to be modified for that bundle. This information may then be provided to the data record generator 84 to which the data record modification processor 86 is communicably coupled. The data record generator 84 may then be configured to retrieve the relevant bundle data structure 40 and amend the record accordingly, before the record is placed back in the memory 22. Once the record has been stored in the memory 22 the data record generator 84 may be configured to send a notification to the transaction management processor 72 (either directly or through the data record modification processor 86) to indicate the change has been enacted. In some cases, the data record generator 84 may also be configured to ensure that any required changes are in accordance with the restrictions in the bundle rules store 88 (in a process analogous to the initial check performed upon creation of a new bundle). If the changes are in accordance, the changes will be enacted in accordance with the description above. If the changes are not in accordance, the data record generator 84 may be configured to generate a notification to be transmitted to the transaction management processor 72 (directly or indirectly) to indicate that this change is not permissible, and the change is not enacted.

In some further embodiments, the data record modification processor 86 may be configured to perform any of the functionality of the data record generator 84 as described above with reference to modifications to existing bundle data records. In such instances, the data record modification processor 86 may be configured to be communicably coupled to the memory 22 and the bundle rules store 88 in order to enable this functionality.

Figure 5:
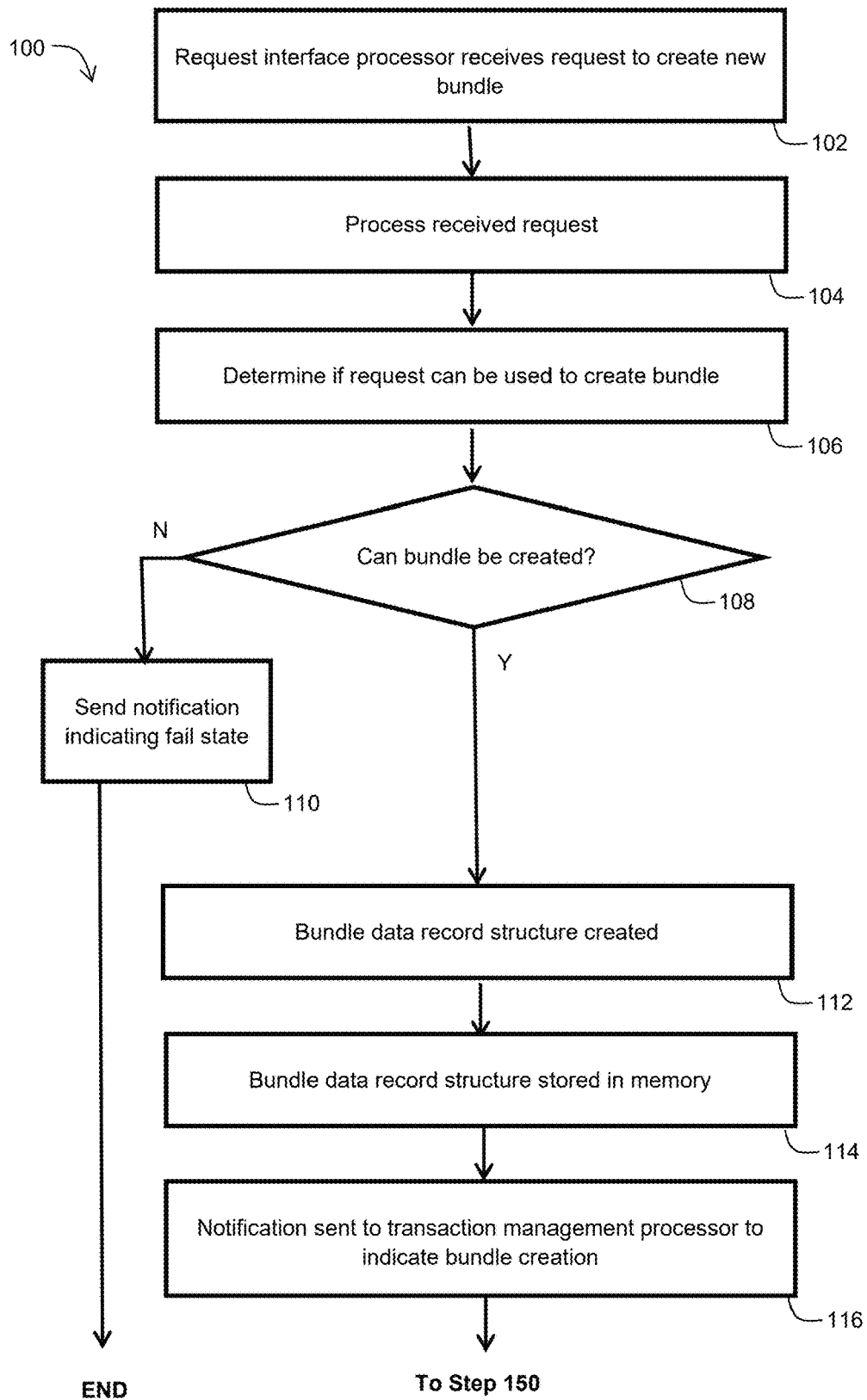
FIG. 5 is a flow diagram, showing a method of processing received requests for the generation of a new bundle from a seller by the bundle generation processor of FIG. 4.

Referring now to FIG. 5, there is shown in detail a method of operation 100 of an embodiment of the bundle generation processor 70 of FIG. 4. In particular, the method of operation 100 illustrates the process of a bundle being generated after receiving a request to do so from a user 12. In this instance, the user 12 will be referred to as a seller.

The method 100 begins at Step 102, when the bundle generation processor 70 receives a request to create a new bundle from a seller. This request will typically be received through the receiver 18 of the inventory management system 10. The request may comprise the receipt of details which enable a bundle to be created to enable sale or disposal of items via the inventory management system 10. The request is received by the request interface processor 80. Once the request has been received, the request is processed, at Step 104, by the request interface processor 80. This processing may comprise any one or more of ensuring that the request is in a suitable format for further processing by the inventory management system 10, assigning a unique identifier to the request and verifying the veracity and integrity of the request to ensure that the request can be processed.

Once the request has been processed, the method 100 continues, at Step 106, to determine if the received request can be used to create a bundle. This step may comprise determining, by the request interface processor 80, whether the request is complete (in accordance with the initial processing step of Step 104 above). This step may also comprise determining, by the data record generator 84, whether the received request is in accordance with established requirements for bundles which are to be made available. This may comprise retrieving relevant rules for the bundle from the bundle rules store 88 and determining whether the received information is in accordance with these rules. If it is determined, at Step 108, that the bundle cannot be created for any reason, then the method of operation 100 proceeds by sending, at Step 110, a notification indicating a fail state of the creation of the bundle to the seller which provided the original request. This may comprise either the request interface processor 80 or the data record generator 84 (as appropriate), instructing the notification system 82 to provide a notification to the seller indicating that the bundle cannot be created, and the reason for this. This notification may be transmitted using the transmitter 20 of the inventory management system 10. Following this, the method of operation 100 proceeds to end.

Returning to Step 108, if it is determined that the bundle can be created, the method 100 then proceeds by creating, at Step 112, one or more bundle data record structures 40 in relation to the request by the data record generator 84. This may comprise categorising the received data into relevant data parameters in accordance with the example structure 40 shown in FIG. 2. This may also comprise appending the received information with additional information which may aid in the subsequent processing of the bundle in accordance with embodiments described above (e.g. the creation of, and subsequent inclusion in the data structure 40, a bundle reference to identify the bundle).

Once the bundle data record structure 40 has been created, the method 100 proceeds by storing, at step 114, the created data record structure(s) 40 in the memory 22 of the inventory management system 10. This memory 22 may then subsequently be accessed as required to enable further processing of the bundle and bundle request. This may be achieved by the data record generator 84 sending the created record to the memory 22 of the inventory management system 10 to which it is communicably coupled.

Following this, the method 100 continues by notifying, at Step 116, the transaction management processor 72 to indicate that a new bundle has been created and is available for subsequent processing. The notification may simply comprise the data record generator 84 directly notifying the transaction management processor 72 accordingly, through direct communicable coupling. In some embodiments, the notification system 82 may be configured to generate this notification and to be communicably coupled to the transaction management processor 72 to enable this.

Following this notification, the bundle may then proceed to Step 150 to be processed further by the transaction management processor 72. This will be described in further detail below with reference to FIG. 7A.

Figure 6:
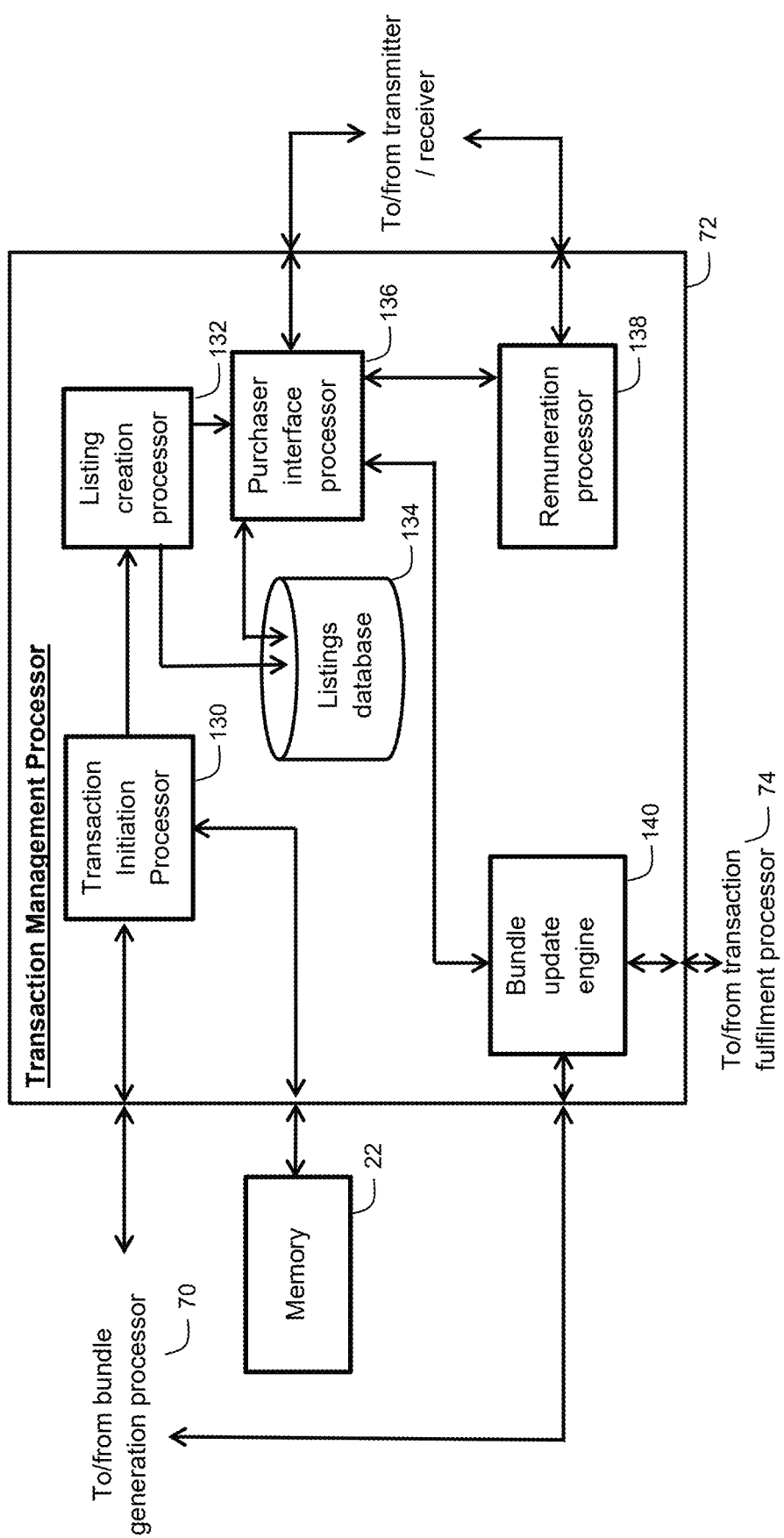
FIG. 6 is a schematic block diagram, showing a transaction management processor of the processing engine of FIG. 1.

Turning now to FIG. 6, there is shown in greater detail the transaction management processor 72 of FIG. 3. Specifically, FIG. 4 illustrates the features which may be included in the transaction management processor 72 to achieve the desired functionality of the inventory management system 10.

The transaction management processor 72 firstly includes a transaction initiation processor 130 which is configured to be communicably coupled to the bundle generation processor 70 (and in particular the data record generator 84). The transaction initiation processor 130 is configured to receive notifications from the bundle generation processor 70 which indicate that a new bundle has been created and is available to be purchased. This notification may include sufficient information to identify the bundle which has been created and to enable relevant details regarding the bundle to be retrieved from the memory 22. The transaction initiation processor 130 may also be configured to send a notification back to the bundle generation processor 70 to indicate that the notification has been successfully received.

Upon receipt of the notification, the transaction initiation processor 130 is configured to retrieve relevant information regarding the created bundle from the memory 22 of the inventory management system 10. The retrieval may be enacted by searching the memory 22 for bundle data structures with a bundle ID matching the one provided by the bundle generation processor 70. This retrieved information is then passed to the listing creation processor 132 to which the transaction initiation processor 130 is communicably coupled. In some embodiments, the transaction initiation processor 130 may alternatively or additionally be provided with the relevant information regarding the created bundle from the bundle generation processor 70 in tandem with receiving notifications indicating that the bundle has been created.

The listing creation processor 132 is configured to create new listings to be transmitted for display on a user device which enable users 12 to request transfer of the items in a bundle (these users 12 will be referred to as "purchasers"). The listing creation processor 132 receives relevant information regarding a newly created bundle from the transaction initiation processor 130 and processes this information such that it is in a suitable format for transmission to potential purchasers. This processing may comprise determining which of the relevant information which has been received regarding a bundle should be included in a listing prior to a listing being generated. For example, the relevant information may include information which is not relevant to be displayed in a listing (e.g. a timestamp on the bundle) and the listing creation processor 132 may be configured to omit this information from being transmitted. Typically, the information to be included in a listing will at least include a way of identifying the bundle when receiving future communications from a purchaser, an indication of the items to be included in the bundle (both item types and number of items), and the price of the bundle.

In further embodiments, the inventory management system 10 may be configured such that all sellers and purchasers remain anonymous from one another during an inventory transaction. In such embodiments, the listing creation processor 132 will be configured to remove any information which may be used to identify the seller upon creation of the listing creation processor 132.

Once the information has been processed, this information is transmitted by the listing creation processor 132 to a listings database 134, to which it is communicably coupled. The information is stored such that the information regarding a particular bundle may be retrieved at a later date. In some embodiments, the information may instead be stored in the memory 22 of the inventory management system 10. The information stored in the listings database 134 for each bundle may also comprise an indication of the state of the listing, to indicate whether a transaction is ongoing relating to a particular bundle, for example whether a purchaser has initiated a purchase of the bundle.

Figure 10:
FIG. 10 is an example graphical user interface for use by a purchaser of a bundle in accordance with an example implementation of the inventory management system of FIG. 1.

The transaction management processor 72 further comprises a purchaser interface processor 136. This is configured to communicate with a purchaser through use of the transmitter 20 and receiver 18 of the inventory management system 10. The purchaser interface processor 136 is configured to receive requests from a purchaser to retrieve details regarding available bundles which may be purchased. Following the request for this information, the purchaser interface processor 136 is configured to retrieve all suitable bundles from the listings database 134. Suitable bundles may comprise all listing in the listings database 134 for which a purchase has not yet been initiated. In some embodiments, the request from the purchaser may include a filter to request only bundles which match the parameters of the filter (e.g. a certain type of item, a limit on the price etc). In this case, the purchaser interface processor 136 may be configured to only retrieve bundles which match the filtered request, based on information stored in the listings database 134. In either case, following retrieval of the bundles the purchaser interface processor 136 is configured to provide the retrieved information to the purchaser. This may be provided in any format suitable for viewing on a purchaser device. In some embodiments, the purchaser interface processor 136 is configured to generated a graphical user interface (GUI) which displays the bundle information to be displayed. An example of such a GUI 300 is illustrated in FIG. 10. In other embodiments, the graphics processor may be configured to generate a text listing of the relevant information. It is to be appreciated that these are two non-limiting examples of ways in which the graphics processor may be configured to display the bundle information, and that any suitable display may be used.

The transmitted information will then be shown on a purchaser device (not shown). The purchaser device may be any device which enables the purchaser to interact with the bundle listing (such as a PC, laptop, tablet, phone, etc).

The purchaser interface processor 136 is also configured to receive requests from a purchaser to purchase (or otherwise obtain) a bundle for which information has previously been provided in a listing. This request will typically comprise at least an indication of the bundle (or listing) that the purchaser wishes to obtain, an identity of the purchaser, the items included in the bundle, and details of remuneration for the transaction (e.g. bank details). Upon receipt of the request, the purchaser interface processor 136 is configured to provide the details of the request to a bundle update engine 140 to which it is communicably coupled. This will typically at least comprise an indication of the bundle to be purchased and an identity of the purchaser. The purchaser interface processor 136 is also communicably coupled to a remuneration processor 138. The purchaser interface processor 136 provides remuneration details for a bundle purchase to the remuneration processor 138, along with details regarding the bundle to which the remuneration relates (e.g. the remuneration details of both the purchaser and the seller). The remuneration processor 138 is configured to process the remuneration in accordance with predetermined parameters. In some embodiments, the remuneration processor 138 will initiate remuneration upon receipt of the details from the purchaser interface processor 136. This may comprise contacting relevant banking organisations to transfer money between a purchaser account and a seller account. Following the transfer, the remuneration processor 138 may indicate to the purchaser interface processor 136 that payment has been made, and this may be used to update the relevant listing and/or relevant bundle data records. In further embodiments, the remuneration processor 138 may be configured only to initiate remuneration and subsequent updating of the listing and/or bundle data records once a bundle has been determined to be fulfilled (see below for further discussion of this aspect of the disclosure).

In some embodiments, required remuneration may be provided through use of an intermediary party or account, such that direct transfer of remuneration between a seller and a purchaser is not required. This may be of benefit in particular where anonymity between seller and purchaser is to be maintained. This also may enable transfer of remuneration to be made more securely. In such embodiments the remuneration processor 138 is configured to provide the remuneration to the intermediary party first, and then instruct transfer of this remuneration to the seller. In some embodiments, the remuneration from the purchaser to the intermediary party is made upon receipt of an accepted purchaser. The transfer on to the seller may then be made once the transaction has been successfully fulfilled. In instances where fulfilment is unsuccessful, the remuneration may then be transferred back to the purchaser.

In some embodiments, once a request for purchase has been initiated for a particular listing, the listing may be removed from the listings database 134 in order to prevent it from being displayed to further purchasers. Alternatively, the relevant listing in the database may be updated to indicate that the listing has been requested but not removed from the database. The purchaser interface processor 136 may be configured to prevent display of listings in the listings database 134 which are marked as purchased upon further requests for listings from purchasers.

Turning to the bundle update engine 140, this feature is configured to monitor ongoing modifications to the bundles and to monitor whether an initiated transaction has been fulfilled. For this purpose, the bundle update engine 140 is communicably coupled to the data record modification processor 86 of the bundle generation processor 70. Upon receipt of information from the purchase interface processor, the bundle update engine 140 will provide the received information to the data record modification processor 86 of the bundle generation processor 70. This will comprise an indication that the bundle has now received a request for purchase and the identity of the purchaser. The data record modification processor 86 then proceeds to update a relevant bundle data record in accordance with embodiments described above (e.g. to update a relevant bundle data record with a status to indicate it has been purchased and to include the identity of the purchaser). Once the update has been made, the data record modification processor 86 may be configured to provide a notification to the bundle update engine 140 to indicate that the update is now included in the bundle data record. Additionally, the bundle generation processor 70 is configured to instruct the notification system 82 to provide a notification to the seller to inform them of the purchase of the bundle. This notification is configured to prompt the seller to provide any items included in the bundle to the shared inventory space (in the case that not all of the bundle items are already present). This notification may also be configured to inform the seller of any relevant time limits by which they must provide all items to the shared inventory space.

The bundle update engine 140 is also configured to be communicably coupled to the transaction fulfilment processor 74. Upon receipt of the information from the purchaser interface processor 136, the bundle update information is configured to send a transmission to the transaction fulfilment processor 74 to initiate a monitoring process of the items in the bundle to determine whether the items have been provided in order to allow the transaction of the bundle to complete. Typically, this may comprise a request being sent from the bundle update engine 140 to the transaction fulfilment processor 74 to query whether the relevant items in the bundle are already present in the relevant shared inventory space.

The bundle update engine 140 is further configured to receive transmissions from the transaction fulfilment processor 74 which provide indications of the items which are present in the shared inventory space in relation to a particular bundle (herein described as fulfilment updates). In some embodiments, these transmissions are only received once all items for a particular bundle are denoted as present in the shared inventory space. In further embodiments, the bundle update engine 140 may be configured to periodically receive updates regarding items which are present in the shared inventory space for a bundle, even when all items are not present (and the bundle is therefore not fulfilled). The operation of the transaction fulfilment processor 74 and the provision of fulfilment will be described in more detail below with reference to FIG. 8.

The bundle update engine 140 is further configured to send further transmissions to other aspects of the inventory management system 10 upon receiving fulfilment updates from the transaction fulfilment processor 74. In the case where a fulfilment update indicates that all items for a bundle are present in the shared inventory space, the bundle update engine 140 is configured to send transmissions to both the bundle generation processor 70 and the purchaser interface processor 136 in order to initiate completion of the transaction. In particular, the transmission to the bundle generation processor 70 may be configured such that the bundle data record is updated to indicate that the bundle transaction is complete. In some embodiments, the bundle data record may also be configured to be deleted at this time. In further embodiments, the bundle generation processor 70 may also be configured to inform the seller that the bundle transaction is complete. The transmission to the purchaser interface processor 136 is configured to similarly update the listings database 134 to indicate that the listing is complete and/or to remove the listing from the listings database 134. In embodiments in which remuneration is configured to only be provided upon completion of a transaction, the purchaser interface processor 136 may also be configured to instruct the remuneration processor 138 to initiate remuneration for the bundle at this point. The purchaser interface processor 136 may also be configured to send a transmission to the purchaser indicating completion of the transaction at this point.

Returning to the bundle update engine 140, where a fulfilment update indicates that all items for a bundle are present in the shared inventory space, the bundle update engine 140 may be configured to send an instruction to the transaction fulfilment processor 74 to enact ownership transfer of the items of the bundle. Typically, the transaction fulfilment processor 74 will already be configured to communicate with external shared inventory stock management systems in order to receive information regarding items which are present in the shared inventory space (as will be described below). The instruction from the bundle update engine 140 will instruct the transaction fulfilment processor 74 to further instruct the external shared inventory stock management systems to amend records to show that the assets are now owned by the purchaser following a successful transaction. In some embodiments, the inventory management system 10 may be configured to act on the assumption that a transaction will be successful. In such embodiments, the ownership of the assets may be configured to be transferred as soon as a purchase offer is made. This will proceed as described above, with the difference being simply that the instruction is enacted as soon as a purchase is offered/accepted by a seller (as opposed to once the transaction is successfully completed). If the transaction later fails, the inventory management system 10 may be configured to reverse any ownership updates that have been made. By enabling transfer of items immediately, this may enable the purchaser to immediately list the goods for sale on an e-commerce system, thereby promoting a smoother sale process than may otherwise be possible. In some further embodiments, once a purchase offer for a bundle is made, all items in the bundle will be made eligible for transfer. However, the ownership transfer of the items is only enacted once the item is noted as being present in the shared inventory space (where the presence of the items is determined via updates from the bundle update engine 140 as described herein). In this embodiment, the purchaser is only provided ownership of items which are available for further despatch. However, this advantageously means that the purchaser is not required to wait for all items in the bundle to be present in the shared inventory space before any transfer of ownership may be enacted.

In embodiments in which the transaction fulfilment processor 74 is configured to provide periodic updates regarding the fulfilment status of the bundle to the bundle update engine 140, when such an update is received, the bundle update engine 140 is configured to update the other features of the inventory management system 10. In particular, the bundle update engine 140 may be configured to instruct the bundle generation processor 70 to update the bundle data record for the relevant bundle. This may comprise updating the bundle data record to indicate which of the items in the bundle are present in the shared inventory space. Similarly, in some embodiments, the purchaser interface processor 136 may be provided with an instruction to update the relevant listing in the listings database 134 to indicate which items are present in the shared inventory space. In some embodiments, the inventory management system 10 may be configured to initiate remuneration when a certain proportion of the items are present in accordance with a predetermined threshold. If the update indicates that this threshold has been reached, remuneration may be initiated in accordance with embodiments described above.

In some embodiments of the present disclosure, the inventory management system 10 may be configured to limit the amount of time that a seller has to fulfil the requirements of the transaction prior once it has been initiated (e.g. 14 days). Such a limitation may be included in the bundle rules store 88 of the bundle generation store and may be included as a parameter in the bundle data record. In such embodiments, once an offer has been received by the purchaser interface processor 136 and the relevant information has been provided to the bundle update engine 140, the bundle update engine 140 indicates the time limitation to the transaction fulfilment processor 74. The transaction fulfilment processor 74 may then be configured to provide updates as described in embodiments above, but will also be instructed to provide a final update in the scenario in which the time limit has elapsed and the bundle is not fulfilled (i.e. not all of the items have been provided). Upon receipt of such an update, the bundle update engine 140 is configured to provide instructions to update the bundle data record and listing in the listings database 134 accordingly to highlight that the transaction has not been successfully completed. In addition, the instructions may be configured to cause the bundle generation processor 70 and the purchaser interface processor 136 to inform the seller and purchaser of the failed transaction. In addition, the purchaser interface processor 136 may be configured to instruct the remuneration processor 138 to cancel the pending remuneration transfer in cases where remuneration is only provided upon completion of a transaction. In embodiments in which remuneration has already been paid, the remuneration processor 138 may be configured to automatically reverse the transaction upon indication that the transfer of items has been unsuccessful. In some cases, where a purchase has failed, the inventory management system 10 may be configured to automatically allow the bundle to still be offered for purchase as a listing by another purchaser. This may comprise updating the listing and the bundle data record to revert it back to its original state (i.e. that the bundle status is unpurchased, and that the listing is available for display to a purchaser upon request).

In some embodiments, if a transaction of items is unsuccessful due to a failure to provide items, the inventory management system 10 may also be configured to initiate further punitive measures to the seller in response. These punitive measures may be incurred as an alternative to, or in addition to a reversal of any transferred remuneration as described in embodiments above. These punitive measure may constitute a proportionate refund of the cost where only a portion of the sold goods are not provided, or any other appropriate measure, financial or otherwise. These punitive measures may be instructed by the remuneration processor 138 upon receiving an indication that the bundle has not been fulfilled in accordance with embodiments described above. The remuneration processor 138 may enact any financial punitive measures using the remuneration details of the seller and the purchaser which have previously been provided. In some further embodiments, the punitive measures may comprise preventing the seller from listing any further bundles for a period of time, where this period of time may be predetermined by a user of the system.

Figure 7A:
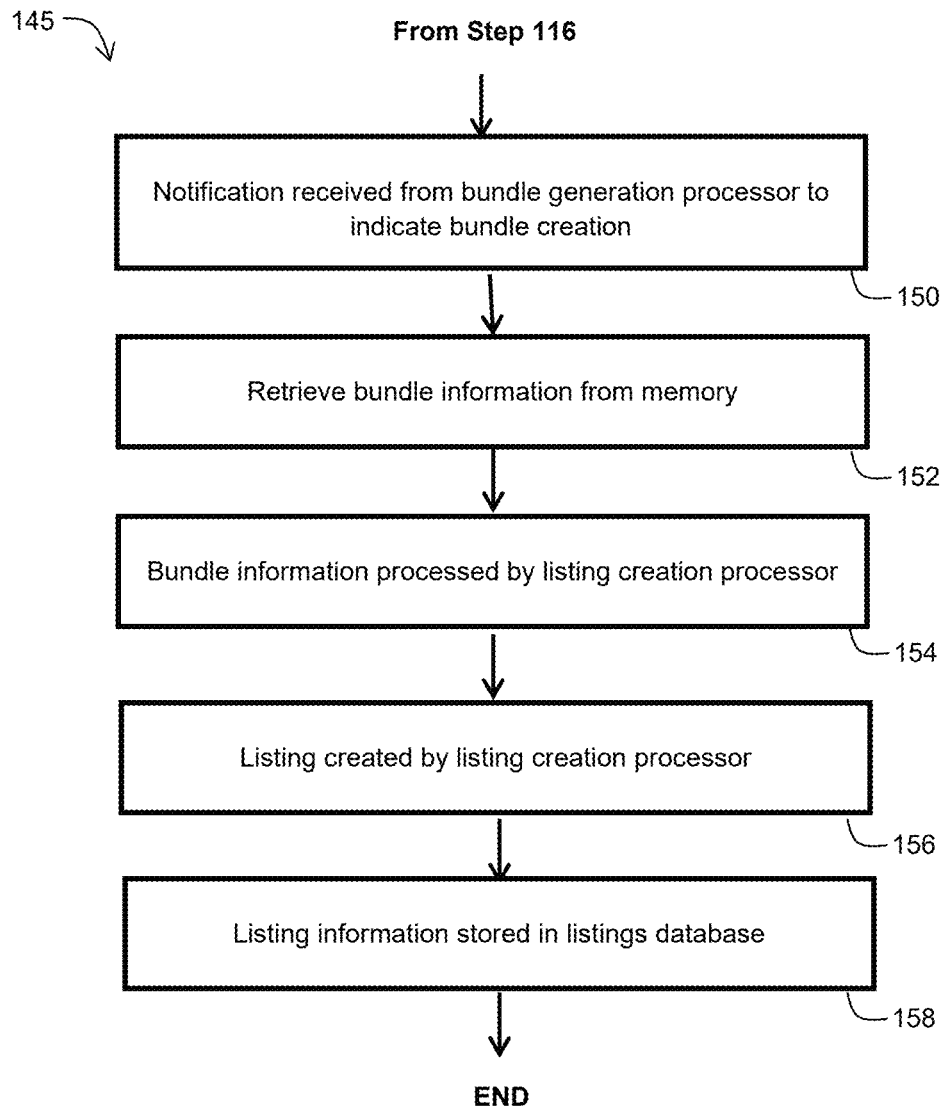
FIG. 7A is a flow diagram, showing a method of generating new listings by the transaction management processor of FIG. 6.

Referring now to FIG. 7A, there is shown in detail a method of operation 145 of an embodiment of the transaction management processor 72 of FIG. 6. In particular, the method of operation 145 illustrates the process of a listing being generated following the initial creation of a bundle data record.

The method 145 begins at Step 150, when the transaction management processor 72 receives a notification from the bundle generation processor 70 that a new bundle has been created along with an identifier of the bundle. This will typically be provided by the data record generator 84 in accordance with the method 100 described in FIG. 5 (following from Step 116) and will typically be received by the transaction initiation processor 130. Following this, the transaction initiation processor 130 retrieves, at Step 152, relevant information regarding the newly created bundle from the memory 22 where the bundle data record is stored. In some embodiments, this step may be omitted and the relevant information may be provided at the same time as the request from the data record generator 84.

Once the information has been retrieved, the bundle information is processed, at Step 154 by the listing creation processor 132. The processing of the information comprises determining which of the relevant information which has been received regarding a bundle should be included in a listing prior to a listing being generated. For example, the relevant information may include information which is not relevant to be displayed in a listing (e.g. a timestamp on the bundle) and the listing creation processor 132 may be configured to omit this information from being transmitted. Typically, the information to be included in a listing will at least include a way of identifying the bundle when receiving future communications from a purchaser, an indication of the items to be included in the bundle (both item types and number of items), and the price of the bundle. In embodiments where the system is configured such that all sellers and purchasers remain anonymous from one another during an inventory transaction, the listing creation processor 132 will be configured to remove any information which may be used to identify the seller upon creation of the listing creation processor 132.

Once the information has been processed, the listing is created, at Step 156, by the listing creation processor 132. This may comprise placing the information in a format suitable for display at a purchaser user terminal. In some further embodiments, this may also comprise retrieving and including with the listing, relevant images of the items in the bundle. These images may be included with the bundle data record, or may be stored in a memory 22 of the system, and the listing creation processor 132 is configured to retrieve these images. Once the listing is created, the listing is then stored, in Step 158 in the listings database 134, where it is able to be subsequently retrieved upon request from a purchaser. The method 145 then ends.

Figure 7B:
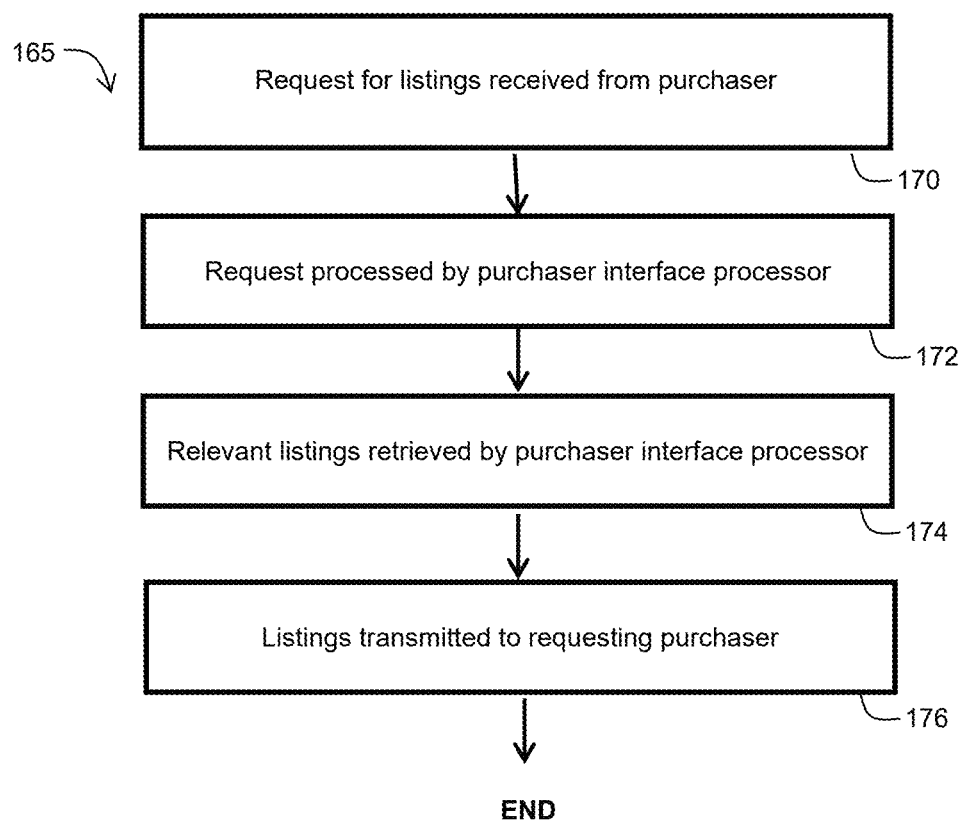
FIG. 7B is a flow diagram, showing a method of receiving and processing requests for available bundles by the transaction management processor of FIG. 6.

Referring now to FIG. 7B, there is shown in detail a method of operation 165 of an embodiment of the transaction management processor 72 of FIG. 6. In particular, the method of operation 165 illustrates the process of receiving a request for a listing from a purchaser.

The method 165 proceeds at Step 170, when the transaction management processor 72 receives a request from a purchaser to provide listings for available bundles. This will typically be received by the purchaser interface processor 136 through the receiver 18 of the inventory management system 10. Once the request has been received, the request is then processed, at Step 172, by the purchaser interface processor 136. This processing may comprise determining all suitable listings from the listings database 134. Suitable listings may comprise all listing in the listings database 134 for which a purchase has not yet been initiated. In some embodiments, the request from the purchaser may include a filter to request only bundles which match the parameters of the filter (e.g. a certain type of item, a limit on the price etc). In this case, the purchaser interface processor 136 may be configured to only retrieve bundles which match the filtered request, based on information stored in the listings database 134. Once the request has been processed, the listings are retrieved, at Step 174, from the listings database 134.

Following retrieval of the listings from the listings database 134, the purchaser interface processor 136 is configured to transmit, at Step 176, the retrieved information to the purchaser. This may be provided in any format suitable for viewing on a purchaser device. In some embodiments, the purchaser interface processor 136 is configured to generate a GUI 300 which displays the bundle information to be displayed. In other embodiments, the graphics processor may be configured to generate a text listing of the relevant information. It is to be appreciated that these are two non-limiting examples of ways in which the graphics processor may be configured to display the bundle information, and that any suitable display may be used. The method 165 then proceeds to finish.

Figure 7C:
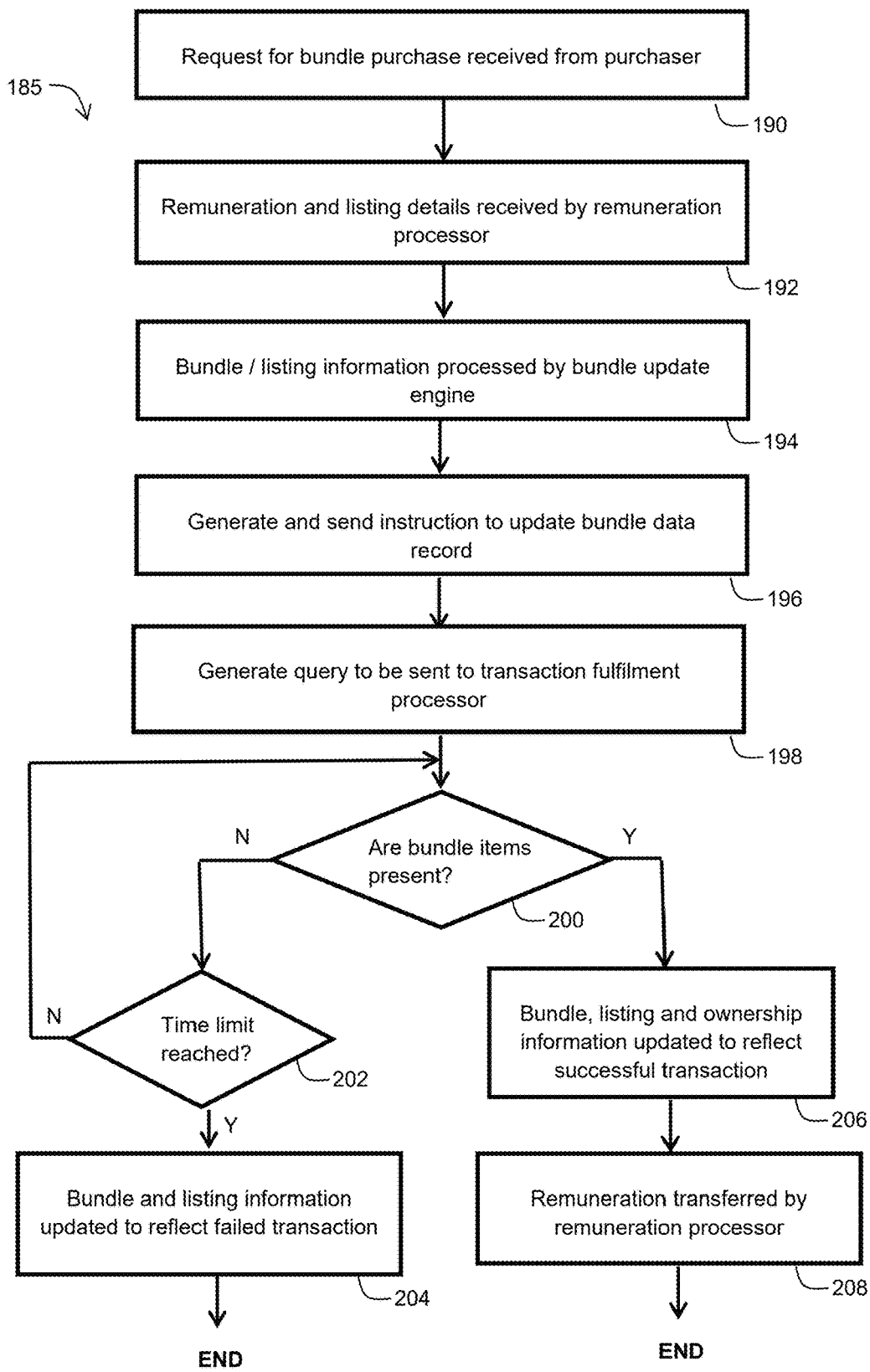
FIG. 7C is a flow diagram, showing a method of receiving and processing requests for purchase of a bundle by the transaction management processor of FIG. 6.

Turning to FIG. 7C, there is show a method of operation 185 of an embodiment of the transaction management processor 72 of FIG. 6. In particular, the method of operation 185 illustrates the process by which a request for purchase of a bundle is processed and the transaction subsequently monitored. This request will typically comprise at least an indication of the bundle (or listing) that the purchaser wishes to obtain, an identity of the purchaser, the items included in the bundle, and details of remuneration for the transaction (e.g., bank details). In particular, the method of operation 185 relates to an embodiment in which remuneration is only provided to a seller upon all of the items of the bundle being provided to the shared inventory space.

The method 185 proceeds, at Step 190, by the purchaser interface processor 136 receiving a request for purchase of a bundle. Once the request is received, the remuneration and listing details of the purchaser are received, at Step 192, by the remuneration processor 138. In the presently described method 185, the remuneration processor 138 does not perform any further action at this point but simply retains the information. In some embodiments, the provided details may be stored in a local memory for subsequent retrieval. Returning to the method 185, substantially concurrently with Step 192, the bundle update engine 140 is configured to receive, at Step 194, the details of the purchased listing/ bundle from the purchaser interface processor 136. This will typically at least comprise an indication of the bundle to be purchased (and the items therein references) and an identity of the purchaser.

Following this, the bundle update engine 140 then generates and sends, at Step 196, an instruction to update the relevant bundle data structure 40 relating to the listing to the bundle generation processor 70. This instruction will be generated in accordance with embodiments described above. The instruction will result in the relevant bundle data structure 40 being updated to reflect the change in status of the bundle (i.e. that a transaction is now in process for the bundle). In addition, this step may also include the generation and transmission of a notification to the seller of the bundle informing them of the purchase and prompting the seller to provide all the required items of the bundle to the shared inventory space (along with any relevant time limits for doing so).

Substantially concurrently with Step 196, the bundle update engine 140 generates, at Step 198, a query to be sent to the transaction fulfilment processor 74. This query will typically provide an indication regarding the bundle identifier for which the query relates, and at least the items in the bundle for which a status needs to be verified. The purpose of this request is to determine whether the required items in the bundle are already present in the shared inventory space. The query will result in the transaction fulfilment processor 74 providing an update regarding the presence of item in the shared inventory space. Details regarding the process of determining the presence of items will be discussed further with respect to FIGS. 9A and 9B.

Once the query is sent, the method 185 then proceeds by determining, at Step 200 whether the items in the relevant bundle are present in the shared inventory space. If they are present, then the query is returned to the bundle update engine 140 and the method 185 proceeds by updating, at Step 206, the relevant bundle and listing information to indicate that the transaction has been successful. This is in accordance with embodiments described above and may, for example, comprise updating the bundle data structure 40 to indicate a completed status, and to do the same for the listing in the listings database 134. Similarly, a notification may be sent to the transaction fulfilment processor 74 to indicate the successful transaction and to instruct that ownership of the items in relevant shared inventory space stock systems should be updated such that the purchaser is now shown as the owner of the items. In some embodiments, this step may also comprise removing both the bundle data structure 40 from the memory 22 and the listing from the database. Following this, the remuneration relating to the listing is transferred, at Step 208, by the remuneration processor 138 in accordance with embodiments described above.

Returning to Step 200, if it is determined that the items are not present, the method 185 proceeds by determining, at Step 202, whether a predetermined time limit for providing items to the shared inventory space has elapsed. If the time limit has not elapsed, the method 185 returns to Step 200 to determine periodically whether bundle items are present in the shared inventory space. This period may be continuous or may comprise querying on a discrete basis (e.g. every 12 hours). If it is determined that the time limit has been reached, then the transaction is determined to have failed. Once this fail state has been reached, the method 185 continues by returning the query to the bundle update engine 140 indicating the fail state and the method 185 proceeds by updating, at Step 204, the relevant bundle and listing information to indicate that the transaction has failed. This is in accordance with embodiments described above and may, for example, comprise updating the bundle data structure 40 to indicate a failed status, and to do the same for the listing in the listings database 134. In some embodiments, this may also comprise removing both the bundle data structure 40 from the memory 22 and the listing from the database. In additional embodiments, this step may also comprise initiating punitive measures on the seller for their failure to provide the required items, in accordance with embodiments described above.

In some embodiments, the method 185 may also be configured such that the bundle update engine 140 is arranged to receive responses to queries at intermediary points where some of the items of the bundle are determined to be present in the shared inventory space. In such embodiments, the method 185 is modified such that when any items are determined by the transaction fulfilment processor 74 as being present in the shared inventory space, a response to the query is provided to the bundle update engine 140 to indicate which items are present. The bundle update engine 140 is then configured to update the bundle data structure 40 to reflect the presence of the relevant items. In some embodiments, the remuneration processor 138 may be configured to provide partial remuneration representing the proportion of items which have been provided at a point in time, following receipt of such an update.

Figure 8:
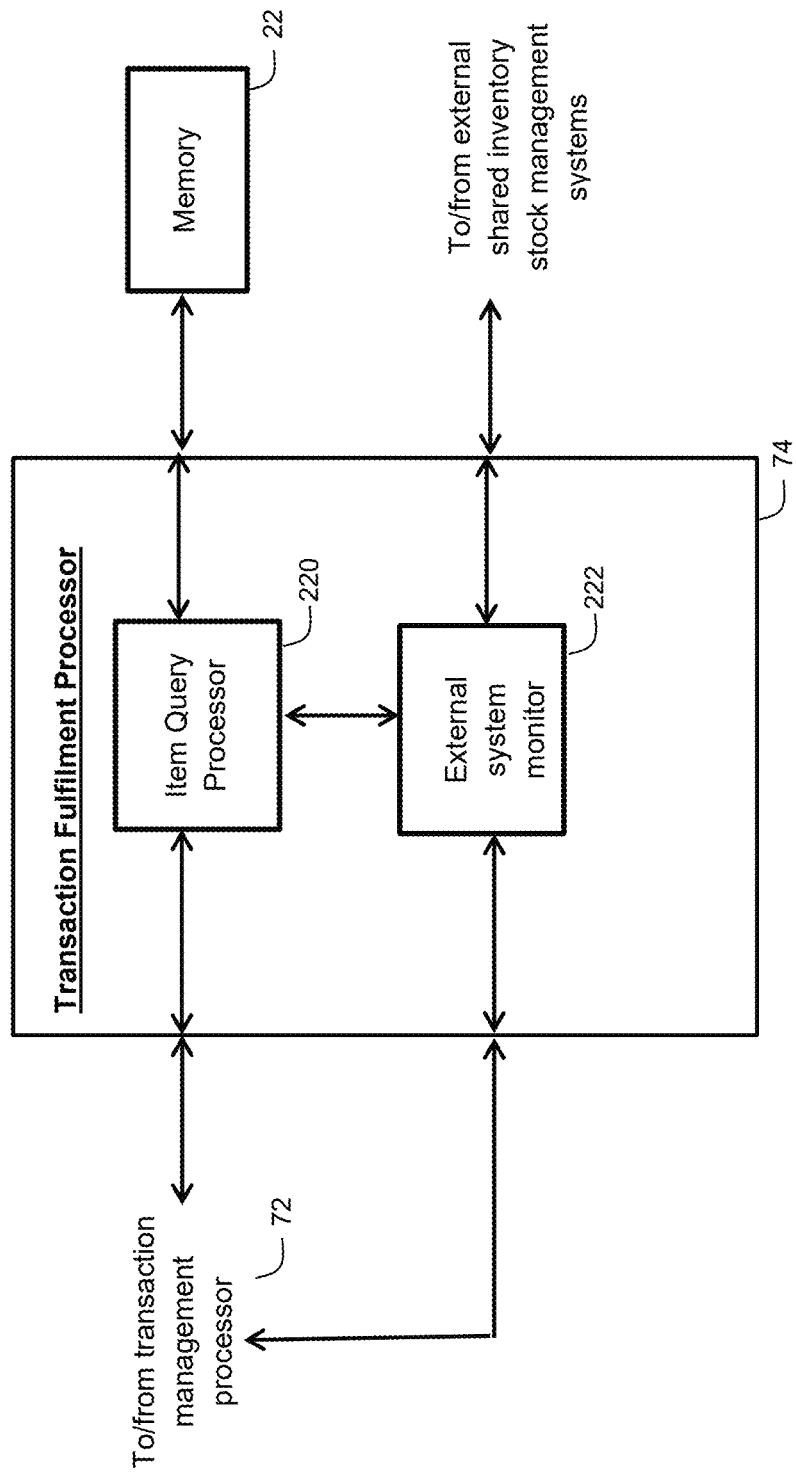
FIG. 8 is a schematic block diagram, showing a transaction fulfilment processor of the processing engine of FIG. 1.

Turning now to FIG. 8, there is shown in greater detail the transaction management processor 72 of FIG. 3. Specifically, FIG. 8 illustrates the features which may be included in the transaction fulfilment processor 74 to achieve the desired functionality of the inventory management system 10.

The transaction management processor 72 firstly includes an item query processor 220 which is configured to be communicably coupled to the transaction management processor 72 (and in particular the bundle update engine 140). The item query processor 220 is configured to receive queries from the bundle update engine 140 which indicate that a bundle or listing has been purchased and that an assessment of whether items in the bundle/listing are present in a shared inventory space. This query may include sufficient information to identify the bundle which has been created and the items which are present in that bundle. In some embodiments, the initial query may comprise the items which need to be verified as being present in the shared inventory space. In other embodiments, the item query processor 220 is configured to retrieve data indicating the items to be verified from the memory 22 of the inventory management system 10. This may be enabled by the query providing a bundle identifier for the relevant bundle. The transaction fulfilment processor 74 may also be configured to send a notification back to the bundle update engine 140 to indicate that the notification has been successfully received.

The item query processor 220 is further communicably coupled to an external system monitor 222. The external system monitor 222 is configured to be in communication with systems external to the inventory management system 10 which are able to provide data regarding the items which are present in a shared inventory space. These may comprise stock or inventory systems which are present in the shared inventory space and which hold data records regarding the contents of one or multiple areas which comprise the shared inventory space.

By way of example, a shared inventory space may comprise one or more warehouses, each comprising their own stock management systems which keep records regarding items present in the warehouse and the items which are booked into and taken out of the warehouse and to which party the items belong to. In this manner, the warehouses each are able to provide a comprehensive assessment of all of the items of the warehouse. These assessments are able to be concatenated for each physical warehouse to form an overall assessment for the shared inventory space (where the shared inventory space comprises each of these warehouses).

The external system monitor 222 receives data from the item query processor 220 indicating the items which are required to be present in the shared inventory space, and the party which needs to be the owner of these items. The external system monitor 222 then transmits a request to the external shared inventory stock management systems to query whether these items are present. This transmission and subsequent receipt of information will typically be made via the transmitter 20 and receiver 18 of the inventory management system 10. The external system monitor 222 may be arranged to periodically query the external shared inventory stock management systems for inventory data until such a time as all of the required inventory is present. In such embodiments, the external system monitor 222 may be configured to compare the result of the query with previously received queries to determine any changes between the items which are noted as present in two different queries.

The external system monitor 222 is also configured to provide notifications to the transaction management processor 72 to provide updates regarding items present in the shared inventory space in accordance with embodiments described above. The external system monitor 222 may be configured to provide these updates periodically or continuously in accordance with the requirements of the bundle update engine 140 as described above. The updates may be configured to be stopped once all of the items required to fulfil the bundle are present in the shared inventory space. Alternatively, the updates may be configured to be stopped once a predetermined time limit for providing the items has elapsed, again in accordance with embodiments described above. In embodiments in which the external system monitor 222 is configured to perform a comparison between queries, the external system monitor 222 may further be configured to provide notification to the transaction management processor 72 as and when the items noted as present in two subsequent queries has changed.

The external system monitor 222 may also be configured to receive transmissions from the transaction management processor 72 indicating that a transaction for a particular bundle/listing has been successful in accordance with embodiments described above. Upon receipt of such transmissions, the external system monitor 222 is configured to send an instruction to the relevant external shared stock management systems that the ownership details of the items in the bundle/listing should be amended to reflect that the items are now owned by the purchaser. The transmission from the transaction management processor 72 may include the item information in order to enable this functionality. Alternatively, the transmission may provide the identifier of the relevant bundle and the external system monitor 222 may be configured to retrieve the relevant item details from the memory 22.

Figure 9A:
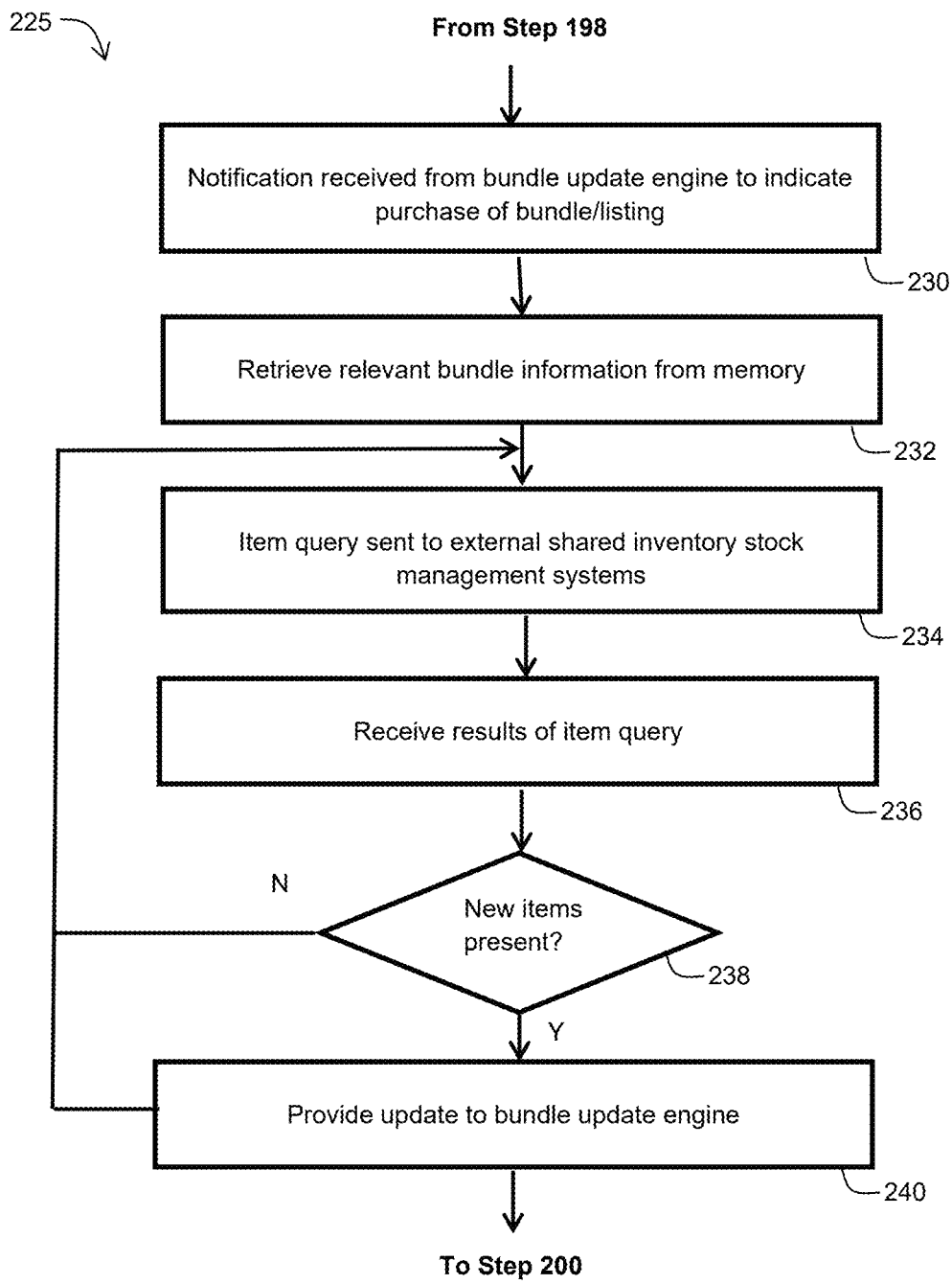
FIG. 9A is a flow diagram, showing a method of querying the items present in the shared inventory space by the transaction fulfilment processor of FIG. 8.

Referring now to FIG. 9A, there is shown a method of operation 225 of the transaction fulfilment processor 74 of FIG. 8. In particular, the method of operation 225 illustrates the process of an item query being generated and subsequently returned to the bundle update engine 140. The embodiment shown illustrates a method of operation 225 in which the transaction fulfilment processor 74 is configured to periodically query the external shared inventory stock management systems until such a time as all items in a bundle are present, or until the transaction is designated to have failed due to a predetermined time threshold being passed (in accordance with previously described embodiments).

The method 225 proceeds when a notification is received, at Step 230, from the bundle update engine 140 to indicate the purchase of a bundle or listing. This follows on from Step 198 of FIG. 7C. When this notification is received, the method 225 proceeds to retrieve, at Step 232, relevant bundle information from the memory 22. This may be achieved by retrieving the items associated with a particular bundle based on a bundle identifier, which will be received as part of the notification from the bundle update engine 140. In some embodiments, this step may be skipped if the relevant item information is provided as part of the initial notification.

The method 225 then continues by sending from the external system monitor 222, at Step 234, an item query to external shared inventory stock systems in order to ascertain which of the items in the bundle are present in the external shared inventory stock systems. In some embodiments, there will be a single external stock system configured to monitor inventory levels in all areas which comprise the shared inventory space. In such embodiments, the query will be sent to this single system. In some embodiments, there may be a plurality of external stock systems (e.g. a stock system for each location which comprises with the shared inventory space). In these embodiments, the query may be sent to each of the relevant stock systems.

Following this, the external system monitor 222 receives, at Step 236, results of the item query from the external shared inventory stock systems. In embodiments in which there is a single external stock system, this will comprise receiving a single transmission. In embodiments in which there are a plurality of external stock systems, this step is completed when each of the relevant systems returns a result. These results will then be concatenated to form the overall result of the query.

The method 225 then determines, at Step 238, whether any new items are present when compared to a previous query for that bundle. In the case that this is the first result of a query for a bundle, all items which are present will be considered to be new. In the case of subsequent queries, a comparison is performed between the items listed in the present query result and the items listed in the previous query result. When it is determined that there are no new items in accordance with the embodiments above, the method 225 returns to Step 234 and a new query is sent to the external shared inventory stock management systems. In some embodiments, this process of querying may be continuous until such a time as the transaction fulfilment processor 74 is instructed to stop the query. In other embodiments, a delay may be in built into the process such that new queries are only requested periodically (e.g. every 12 hours).

Returning to Step 238, if it is determined that new items are present, the external system monitor 222 is configured to provide, at Step 240, an update to the bundle update engine 140 which indicates which items are present in the shared inventory space. In some embodiments, only new items are provided in the update. In alternative embodiments, all of the items of the bundle which are present in the shared inventory space are included in the update. Following the update, the method of FIG. 7C continues at Step 200 based on the results of the update. It is to be appreciated that in FIG. 7C when a query is generated, if no subsequent update is provided by the external systems monitor (i.e. no new items are present), this may be interpreted as the bundle items not being present in accordance with the determination at Step 238.

Once the update has been provided by the external systems monitor (or concurrently with the generation of the update), the method 225 then returns to Step 234 to generate a new query. This is in accordance with above embodiments where query may be generated continuously or periodically.

Figure 9B:
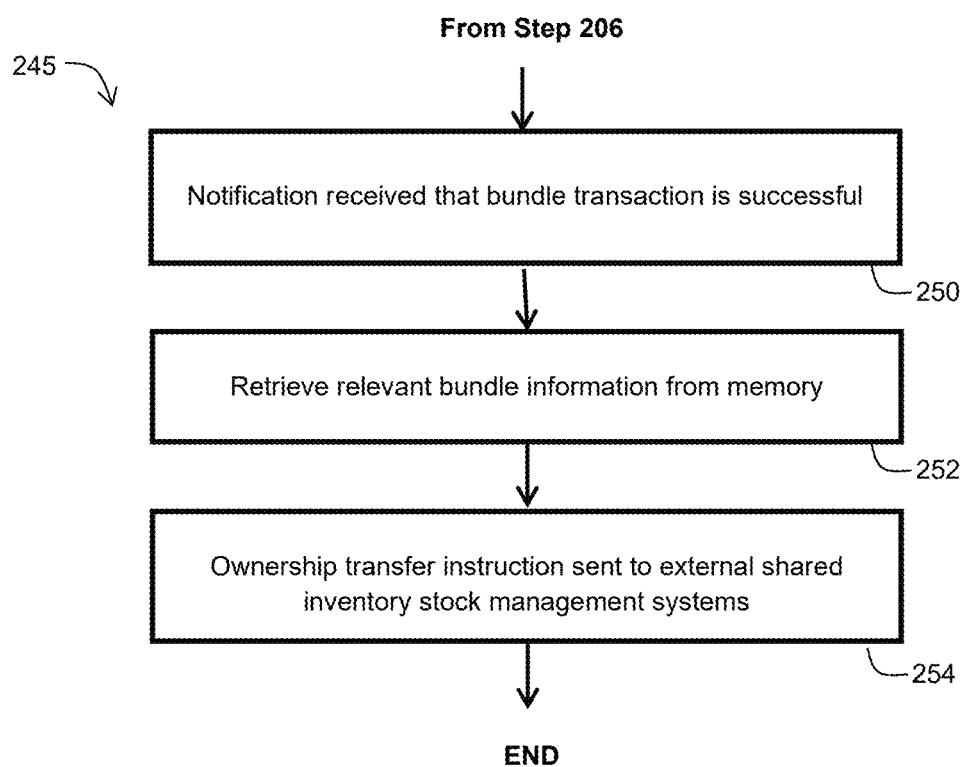
FIG. 9B is a flow diagram, showing a method of updating the ownership of items present in the shared inventory space by the transaction fulfilment processor of FIG. 8.

Referring now to FIG. 9B, there is shown a method of operation 245 of the transaction fulfilment processor 74 of FIG. 8. In particular, the method of operation 245 illustrates the process of an ownership of assets transfer instruction being generated and transmitted.

The method of operation 245 begins when a notification is received, at Step 250, from the bundle update engine 140 to indicate that a particular bundle transaction is successful. This will arise when all items for a particular bundle have been provided in the shared inventory space. When this notification is received, the method 245 proceeds to retrieve, at Step 252, relevant bundle information from the memory 22. This may be achieved by retrieving the items associated with a particular bundle based on a bundle identifier, which will be received as part of the notification from the bundle update engine 140. In some embodiments, this step may be skipped if the relevant item information is provided as part of the initial notification.

Once the relevant information has been retrieved, an ownership transfer instruction (or control signal) is sent, at Step 254, to the applicable external shared inventory stock management systems. This instruction is configured to cause the external shared inventory stock management systems to update the record of ownership of the items of the purchased bundle so that the owner is now shown as being the purchaser of the bundle. In embodiments in which there are a plurality of external shared inventory stock management systems, the instruction will be sent to all relevant systems. Such instructions may be specifically configured such that each instruction relates only to the items present in the portion of the shared inventory space being monitored by the relevant system. The method 245 then still proceeds to end.

PROVIDING ALTERNATIVE CONSIDERATION

In further embodiments, the system may be configured to allow for a purchaser to suggest alternative consideration when requesting purchase of a bundle. For instance, when a bundle is initially created, a seller may specify a particular price for the bundle. The system may be configured such that when a purchaser requests purchase of a bundle/listing, they are afforded the opportunity to suggest an alternative price for the bundle. Further, the purchaser may also request purchase of only a portion of the bundle i.e. if a bundle provided by a seller lists 30 pairs of red sneakers and 20 pairs of blue sneakers, the inventory management system 10 may be configured to enable the purchaser to request 20 pairs of red sneakers and 10 pairs of blue sneakers, with a suggested price for the amended bundle purchase.

To enable this functionality, the transaction management processor 72 (specifically the purchaser interface processor 136) may be configured to receive such alternative offers as part of a received request from a purchaser. In particular, the purchaser interface processor 136 may receive requests for purchase identifying a particular listing, and highlighting any proposed changes (either to the price being paid and/or the items to be purchased). The purchaser interface processor 136 is then configured to pass these suggested amendments to the bundle update engine 140 in addition to the identifier of the listing/bundle. At this point, the bundle update engine 140 will recognise that a standard purchase has not been requested and will be configured not to send a transmission to the transaction fulfilment processor 74 as would be the case if a standard purchase had been requested. Instead, the bundle update engine 140 is configured to send a transmission to the data record modification processor 86 with the proposed amendments and an identification of the bundle to which the amendments relate. This data will then be passed to the data record generator 84. The data record generator 84 may then be configured to retrieve relevant rules from the bundle rules store 88 to determine whether the suggested amendments are in accordance with any requirements of the system (e.g. prices per item). If the requirements are not met, the data record generator 84 may be configured to generate instructions passed back through to the purchaser interface processor 136 to notify the purchaser that the suggested amendments cannot be made.

If it is determined that the suggested amendments are allowable, then the data record generator 84 is configured to instruct the notification system 82 to send a notification to the seller of the bundle that a purchaser has requested amendments to a listed bundle. The data record generator 84 is configured to await a notification from the seller (via the request interface processor 80) indicating whether the amendments are acceptable. In the case that the amendments are not acceptable, the data record generator 84 will be configured to notify the purchaser of this in a manner analogous to when an amendment is not in accordance with the required bundle rules. In some embodiments, the notification may also include further information from the seller with an additional counter offer suggesting an alternative consideration to the consideration initially suggested in the bundle, and that suggested by the purchaser. This suggestion and counter suggestion is analogous to a "bidding process".

In some embodiments, the system is configured to restrict the number of suggestions and counter suggestions to a predetermined limit. If the limit is exceeded, then the purchase process may be cancelled.

In the case that the seller indicates that the amendments are acceptable, the data record generator 84 is configured to then retrieve the relevant bundle from the memory 22 and update the bundle data record with the amendments. This may include updating the selling price of the bundle and/or modifying the items included within the bundle. Once the bundle has been modified, a transmission will be sent to the bundle update engine 140 via the data record modification processor 86. The bundle update engine 140 will then begin the process of updating the various elements of the system in order to determine whether the items for the (modified) bundle are in the shared inventory space, in accordance with embodiments described above. A notification may also be sent to the purchaser to indicate that their suggested modifications have been accepted by the seller. At this time, the remuneration details may be passed to the remuneration processor 138 in accordance with embodiments previously described.

In some further embodiments, the remuneration offered for a particular bundle may not be money. Instead, in some embodiments the system may be considered to accept a provision of items as remuneration for a purchase of a bundle, where the items are provided to the shared inventory space. The provision of items may be specified when the bundle is initially created, or the provision of items may be offered as alternative remuneration when a purchaser suggests alternative consideration.

In these cases, where a purchaser has offered to supply alternative items rather than money when requesting purchase of a bundle, the request will typically provide details regarding the items being offered. In the case that the items are those listed as consideration, the offered items will simply be those items that were originally listed in the bundle and the request from the purchaser may simply acknowledge an acceptance of these terms. In the case that the items are being offered as a form of alternative remuneration, the request will typically comprise an identification of the items and the number of those items, in addition to the information indicating the bundle/listing to which the offer relates. This data will then be passed to the data record generator 84 in accordance with previous embodiments wherein data is passed from the purchaser interface processor 136 upon receipt of a request. Upon receipt of this data (and in the case where the items have been accepted has remuneration as appropriate), the data record generator 84 is configured to generate a new bundle data listing for the items. This bundle data record may be configured such that it cannot be used to generate a listing for display to purchasers (since this is being offered as consideration as opposed to a purchase), but may still be used to create a listing record. Additionally or alternatively, the items offered for consideration may be appended to the existing relevant bundle data structure 40, but be configured such that it is discernible that these items must be provided by the purchaser not the seller. The creation of a new data record and/or listing enables the inventory management system 10 to monitor the items used for consideration in a manner analogous to that for the items being offered for sale. In particular, the inventory management system 10 may monitor whether the items being offered for consideration have been provided to the shared inventory space, and may be configured to only complete the transaction when both the items being purchased and the items being offered as consideration are present in the shared inventory space. In order to enable this, the bundle update engine 140 is configured to query the transaction fulfilment processor 74 for the presence of the items (being the consideration for the bundle) in the shared warehouse space in the same manner as it would for items in a bundle (including the generation of a notification to be transmitted to the purchaser prompting them to provide the offered items and any time limits for doing so). It is to be appreciated that this embodiment may be combined with all embodiments described above regarding updates to the bundles either continuously or periodically throughout the fulfilment process. The system may also be configured to provide punitive measures as described above, and these may be imposed upon either the seller or the purchaser (depending on which party has failed to provide items within a defined time frame).

Concurrent Use of e-Commerce Systems

The above described inventory management system 10 illustrates ways in which items housed in a shared inventory space may be transferred between parties in an efficient manner. It is to be appreciated that these parties may often be bulk suppliers and distributers of items who also engage in digital e-commerce. Whilst the inventory management system 10 may typically involve the transfer of bulk amount of items, e-commerce systems will typically involve an end consumer purchasing comparatively small amounts of items. It can be advantageous to enable the inventory management system 10 to concurrently enable use of the e-commerce systems as well as use of the "bundle" purchase mechanic of the system.

In some embodiments, the inventory management system 10 may be configured to enable an end consumer to continue to purchase individual items which are listed for sale as part of a bundle to bundle purchasers. In such instances, the system may be configured to adjust data parameters of the bundle to reflect purchases made by an end consumer. For example, the system may be configured to lower the amount of the item in the bulk sale item, the price of an individual item in the bulk sale item, or the overall cost of the bulk sale item. This will be discussed in further detail below.

In some embodiments of the system, the inventory management system 10 is communicably integrated with a digital e-commerce system which enables the selling of items within the shared inventory space to a further end-consumer. In some instances, the two systems are functionally distinct, and the operation of the system to enable purchase of bundles of items between a purchaser and a seller are conducted entirely independently of the further sales of individual items to the end consumer. In some embodiments however, the described system operates in a manner which is functionally complementary to the digital e-commerce system, effectively enabling sales of items in the shared inventory space to an end consumer whilst those items are also able to be placed into bundles for bulk sale to a purchaser. Digital e-commerce systems are typically known and so the general functionality of the further sales system will not be described herein as the details are considered to be well known to the person skilled in the art. However, description will be given insofar as is relevant to describing its operation with the inventory management system 10 described herein.

In embodiments in which the system and the digital e-commerce system are functionally complementary, items which are owned by a seller and are located in the shared inventory space are eligible to be both sold through the digital e-commerce system and for sale as part of a bundle of items concurrently. In these embodiments, a seller may list individual items for sale to the end consumer through the digital e-commerce system and may also indicate that the same items are to be provided within a bundle. The bundle may be created in accordance with embodiments described above. The indication regarding items being provided in a bundle may comprise provision of the bundle identifier that the item is listen in. Since items within the bundle may be purchased by an end consumer before the bundle is purchased, this may lead to an instance in which the contents of the bundle necessarily need to be amended prior to the purchase of a bundle. For example, a bundle may list 100 pairs of red sneakers for sale when the bundle is created. Whilst the bundle is listed but prior to it being purchased by a purchaser, 2 pairs of sneakers may be purchased by an end consumer. As a result, the seller of the bundle is now only able to provide 98 pairs of the red sneakers as part of the bundle. In such embodiments, the system may be configured to automatically adjust the bundle data structure 40 to account for any such purchases by an end consumer. In some embodiments, this may be performed automatically without any further input from the seller. For example, the digital e-commerce system may be configured to send a notification to the bundle generation processor 70 indicating the items which have been purchased. The bundle generation processor 70 may then be configured to adjust the bundle information accordingly. In alternative embodiments, each time an item in a bundle is sold to the end consumer, a notification may be provided to the seller to notify of the sale, and to enable them to provide any required updates to the bundle data structure 40. For example, in some cases, the price listed for the bundle may take into account a bulk purchase discount. Upon sale of a certain number of the items in the bundle, it may be appropriate for the amount of the discount to be adjusted accordingly. The user 12 may therefore wish to update the parameters of the bundle to account for this. In such embodiments, when waiting for confirmation from the seller regarding the parameters of the bundle, the bundle itself may be temporarily delisted from sale and become unavailable for purchase by a purchaser. This prevents the accidental purchase of a bundle under conditions which are no longer acceptable to the seller.

Similarly, if a bundle is purchased for items which are shown as for sale on a digital e-commerce platform, the inventory management system 10 may be configured to inform the e-commerce platform of the sale in order to remove the relevant items for sale. This prevents a scenario in which an end consumer purchases an item for sale which is no longer available. Alternatively, the system may be configured to enable the end consumer to still purchase items which are part of a purchased bundle in certain embodiments. For instance, these items may still be intended for purchase by an end consumer, even though the initial owner may have changed from the seller to the purchaser. In some system the e-commerce system may be agnostic as to the owner of the items to be sold to the end consumer since the end consumer is not concerned with whom the owner of the goods is. In this case, the inventory management system 10 may simply be configured to update the e-commerce system regarding the owner, but not to remove the items in the bundle from sale.

Having described several example embodiments and the implementation of different functions of the device in detail, it is to be appreciated that the skilled addressee will readily be able to adapt the basic configuration of the system to carry out described functionality without requiring detailed explanation of how this would be achieved. Therefore, in the present specification several functions of the system have been described in different places without an explanation of the required detailed implementation as this not necessary given the abilities of the skilled addressee to code functionality into the system. Additionally, it is to be understood that features, functions and advantages of different aspects of the present disclosure may be combined or substituted where context allows.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. An inventory management system for managing inventory ownership in a shared inventory space, the system comprising:
one or more receivers configured to receive data from sources external to the inventory management system;
one or more transmitters configured to transmit data to sources external to the inventory management system;
a bundle generation processor, the bundle generation processor being configured to:
receive transfer data from a first user via the one or more receivers indicating a group of items to be made available for a transfer of ownership, wherein the transfer of ownership of the group of items is to be made as a single transaction; and
process the received transfer data and generate a bundle data record comprising one or more data parameters based on the transfer data;
a transaction management processor, the transaction management processor being configured to:
receive a request from a second user via the one or more receivers requesting groups of items available for transfer of ownership;
provide information identifying available groups of items available for transfer of ownership to the second user via the one or more transmitters, based on the received request and the bundle data records;
receive a request for transfer of ownership of a selected group of items of the available groups of items from the second user via the one or more receivers; and
determine whether each item of the selected group of items is present in the shared inventory space; and
a transaction fulfilment processor, the transaction fulfilment processor being configured to:
request and receive item data regarding items present in the shared inventory space from an external shared inventory stock management system via the one or more receivers and transmitters;
provide the item data to the transaction management processor; and
transfer ownership of the selected group of items to the second user based on the item data,
wherein the transaction management processor is configured to determine whether each item of the selected group of items is present in the shared inventory space based on the item data and wherein the transaction fulfilment processor is configured to transfer ownership of the selected group of items to the second user by generating a control signal which is transmitted to the external shared inventory stock management system via the transaction fulfilment processor.

2. The inventory management system of claim 1, wherein:
the transfer data includes remuneration details of the first user and a remuneration consideration relating to the group of items; and
the request for transfer of ownership includes remuneration details of the second user,
wherein the transaction management processor is configured to transfer the remuneration consideration from the second user to the first user when it is determined that each item of the selected group of items is present in the shared inventory space.

3. The inventory management system of claim 2, wherein the remuneration consideration comprises a monetary amount and the transaction management processor is configured to adjust the transferred remuneration consideration when it is determined that one or more items of the selected group of items is not present in the shared inventory space within a predetermined time frame.

4. The inventory management system of claim 3, wherein the adjustment to the transferred remuneration consideration comprises at least one of:
reduction of the remuneration consideration by a fixed amount;
reduction of the remuneration consideration by an amount based on the one or more items not present in the shared inventory space within the predetermine time frame; and
cancellation of the transfer of remuneration consideration.

5. The inventory management system of claim 2, wherein the remuneration consideration comprises a monetary amount and the transaction management processor is configured to transfer the remuneration consideration from the second user to an intermediary account upon receipt of the request for transfer of ownership, and is further configured to transfer the remuneration consideration from the intermediary account to the first user when it is determined that each item of the selected group of items is present in the shared inventory space.

6. The inventory management system of claim 2, wherein the remuneration consideration comprises a second group of items, wherein the second group of items is to be provided by the second user and wherein the transaction management processor is configured to determine whether each item of the second group of items is present in the shared inventory space based on the item data and wherein the transaction fulfilment processor is configured to transfer ownership of the second group of items to the first user by generating a control signal which is transmitted to the external shared inventory stock management system via the transaction fulfilment processor.

7. The inventory management system of claim 1, wherein the transaction management processor is configured to generate a control signal transferring ownership of an item of the selected group of items to the second user upon determining that the item is present in the shared inventory space based on the item data and wherein this control signal is transmitted to the external shared inventory stock management system via the transaction fulfilment processor.

8. The inventory management system of claim 1, wherein the request for transfer of ownership comprises a request to amend at least one of the one or more data parameters of the bundle data record and wherein the bundle generation processor is further configured to:
generate a notification indicating the requested amendments and transmit the notification to the first user;
receive data from the first user indicating whether the requested amendments are accepted; and
wherein the requested amendments are accepted by the first user, update the bundle data record data parameters in accordance with the requested amendments.

9. The inventory management system of claim 8, wherein the one or more data parameters to be amended comprises at least one of:
an amount of items of the selected group of items; and
a remuneration amount of the selected group of items.

10. The inventory management system of claim 1, wherein the shared inventory space comprises a plurality of physical locations which are geographically distinct.

11. The inventory management system of claim 10, wherein the transaction management processor is configured to determine whether each item of the selected group of items is present in a specific location of the plurality of physical locations.

12. The inventory management system of claim 1, wherein the group of items to be made available for a transfer of ownership comprises at least one of:
a plurality of a same item; and
a plurality of different items.

13. The inventory management system of claim 1, wherein the request for groups of items available for transfer of ownership comprises one or more data parameter requirements, and wherein the transaction management processor is further configured to provide information identifying available groups of items available for transfer of ownership to the second user, based on the one or more data parameter requirements.

14. The inventory management system of claim 1, wherein the transaction management processor is configured to periodically request and receive item data regarding items present in the shared inventory space until all items in the selected group of items is determined as present in the shared inventory space or until a predetermined period of time has elapsed.

15. The inventory management system of claim 14, wherein if the predetermined period of time has elapsed, the transaction management processor is configured to cease processing of the request for the selected group of items and to generate and transmit a notification to the second user indicating that the request has not been processed.

16. The inventory management system of claim 1, wherein the bundle generation processor is configured to receive amendment data from the first user indicating amendments to be made to a bundle data structure and to update the bundle data structure in accordance with the amendment data.

17. The inventory management system of claim 1, wherein identifying information of the first user is hidden from the first user and/or identifying information of the second user is hidden from the first user.

18. The inventory management system of claim 1, wherein upon receiving the transfer data, the bundle generation processor is configured to determine if the transfer data is in accordance with predetermined requirements of the inventory management system and where it is not, generate and transmit a notification to the first user indicating that the group of items cannot be made available for transfer of ownership.

19. A method of operating an inventory management system, the method comprising:

receiving transfer data from a first user via one or more receivers configured to receive data from sources external to the inventory management system, indicating a group of items to be made available for a transfer of ownership, wherein the transfer of ownership of the group of items is to be made as a single transaction;

processing the received transfer data and generate a bundle data record comprising one or more data parameters based on the transfer data;

receiving a request from a second user via the one or more receivers requesting groups of items available for transfer of ownership;

providing information identifying available groups of items available for transfer of ownership to the second user via one or more transmitters configured to transmit data to sources external to the inventory management system, based on the received request and the bundle data records;

receiving a request for transfer of ownership of a selected group of items of the available groups of items from the second user via the one or more receivers;

determining whether each item of the selected group of items is present in a shared inventory space;

requesting and receiving item data regarding items present in the shared inventory space from an external shared inventory stock management system via the one or more receivers and transmitters; and transferring ownership of the selected group of items to the second user based on the item data by generating a control signal which is transmitted to the external shared inventory stock management system via the one or more receivers and transmitters, wherein the determination of whether each item of the selected group of items is present in the shared inventory space is based on the item data.

20. A tangible, non-transitory, machine-readable medium, comprising computer-readable instructions that, when executed by one or more processors of a computer, cause the computer to:

receive transfer data from a first user via one or more receivers configured to receive data from sources external to an inventory management system, indicating a group of items to be made available for a transfer of ownership, wherein the transfer of ownership of the group of items is to be made as a single transaction;

process the received transfer data and generate a bundle data record comprising one or more data parameters based on the transfer data;

receive a request from a second user via the one or more receivers requesting groups of items available for transfer of ownership;

provide information identifying available groups of items available for transfer of ownership to the second user via one or more transmitters configured to transmit data to sources external to the inventory management system, based on the received request and the bundle data records;

receive a request for transfer of ownership of a selected group of items of the available groups of items from the second user via the one or more receivers;

determine whether each item of the selected group of items is present in a shared inventory space;

request and receive item data regarding items present in the shared inventory space from an external shared inventory stock management system via the one or more receivers and transmitters; and transfer ownership of the selected group of items to the second user based on the item data by generating a control signal which is transmitted to the external shared inventory stock management system via the one or more receivers and transmitters, wherein the determination of whether each item of the selected group of items is present in the shared inventory space is based on the item data.

* * * * *